US012769071B2

(12) United States Patent
Kim et al.

(10) Patent No.: US 12,769,071 B2
(45) Date of Patent: Oct. 20, 2026

(54) TECHNOLOGIES FOR A PLUGGABLE CONNECTOR FOR PHOTONIC INTEGRATED CIRCUITS

(71) Applicant: Intel Corporation, Santa Clara, CA (US)

(72) Inventors: Dowon Kim, Singapore (SG); Suohai Mei, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 17/548,189

(22) Filed: Dec. 10, 2021

(65) Prior Publication Data

US 2023/0185035 A1 Jun. 15, 2023

(51) Int. Cl.
*G02B 6/42* (2006.01)

(52) U.S. Cl.
CPC ......... *G02B 6/4243* (2013.01); *G02B 6/4213* (2013.01); *G02B 6/4214* (2013.01); *G02B 6/4278* (2013.01)

(58) Field of Classification Search
CPC .. G02B 6/4278; G02B 6/4214; G02B 6/4213; G02B 6/4243
See application file for complete search history.

(56) References Cited

U.S. PATENT DOCUMENTS 7,210,855 B2 5/2007 Rossi et al.
7,362,934 B2 4/2008 Hamano
7,415,184 B2 8/2008 Ghiron et al.
7,869,671 B2 1/2011 Ishida et al.
9,229,169 B2 * 1/2016 Doany .................. H01L 21/302
9,377,588 B2 * 6/2016 Nishimura ........... G02B 6/4214
9,442,255 B2 * 9/2016 Pommer .................. G02B 6/36
9,651,743 B2 * 5/2017 Costello, III ........ G02B 6/3853
9,798,087 B1 * 10/2017 Mathai ................. G02B 6/2938
9,869,829 B2 1/2018 Bowen et al.
10,481,334 B2 * 11/2019 Israel ................... G02B 6/4243
2010/0067900 A1 3/2010 Ishikawa et al.
(Continued)

FOREIGN PATENT DOCUMENTS

WO WO-2020086777 A1 * 4/2020 ........... G02B 6/4292

OTHER PUBLICATIONS

EPO; Office Action issued for EP Patent Application No. 22189977.6, dated Oct. 10, 2024; 8 pages.
(Continued)

*Primary Examiner* — Thomas A Hollweg
*Assistant Examiner* — Marc E Manheim
(74) *Attorney, Agent, or Firm* — Alliance IP, LLC

(57) ABSTRACT

Technologies for optical coupling to photonic integrated circuit (PIC) dies are disclosed. In one illustrative embodiment, a PIC die has one or more waveguides and one or more vertical couplers to reflect light from the waveguides through a surface of the PIC die. An optical connector interface is positioned on the surface of the PIC die with high precision. The optical connector interface includes one or more lenses to collimate light from the one or more waveguides. An optical connector is plugged into the optical connector interface. The optical connector includes one or more lenses to focus the collimated light to one or more optical fibers. As the optical connector is coupling to collimated light, it does not need to be positioned with high precision.

17 Claims, 37 Drawing Sheets

(56) References Cited

U.S. PATENT DOCUMENTS

| | | | |
|---|---|---|---|
| 2010/0296776 A1 | 11/2010 | Ishii et al. | |
| 2013/0114924 A1 | 5/2013 | Loh et al. | |
| 2013/0287339 A1 | 10/2013 | Song et al. | |
| 2015/0370015 A1 | 12/2015 | Aoki | |
| 2016/0116689 A1 | 4/2016 | Hofrichter et al. | |
| 2017/0090132 A1* | 3/2017 | Nagarajan | H04B 10/40 |
| 2019/0079253 A1* | 3/2019 | Koumans | G02B 6/3652 |

OTHER PUBLICATIONS

U.S. Appl. No. 17/548,189, filed Dec. 10, 2021, Dowon Kim.

Barwicz, Tymon, et al. "High-Throughput Photonic Packaging." 2017 Optical Fiber Communications Conference and Exhibition (OFC), Mar. 2017, pp. 1-24.

Hughes, Mike, et al. "A Single-Mode Expanded Beam Separable Fiber Optic Interconnect for Silicon Photonics." 2019 Optical Fiber Communications Conference and Exhibition (OFC), Mar. 2019, pp. 1-3.

Mangal, N., et al. "Expanded-Beam Through-Substrate Coupling Interface for Alignment Tolerant Packaging of Silicon Photonics." 2018 Optical Fiber Communications Conference and Exposition (OFC), Mar. 2018, pp. 1-3.

U.S. Appl. No. 17/478,337, filed Sep. 17, 2021 entitled, Technologies for Optical Coupling To Photonic Integrated Circuits (55 pages).

EPO; Extended European Search Report issued in EP Patent Application No. 22189977.6, dated Jan. 27, 2023; 8 pages.

* cited by examiner

TECHNOLOGIES FOR A PLUGGABLE CONNECTOR FOR PHOTONIC INTEGRATED CIRCUITS

BACKGROUND

Photonic integrated circuits (PICs) can be used for several applications such as communications. Efficiently and cheaply aligning optics to couple light into and out of PICs can be a challenge. Approaches include using V-grooves to align a fiber connector or fabricating a lens attached to the PIC. However, these approaches can be expensive and/or result in low yield.

DETAILED DESCRIPTION

Figure 1:
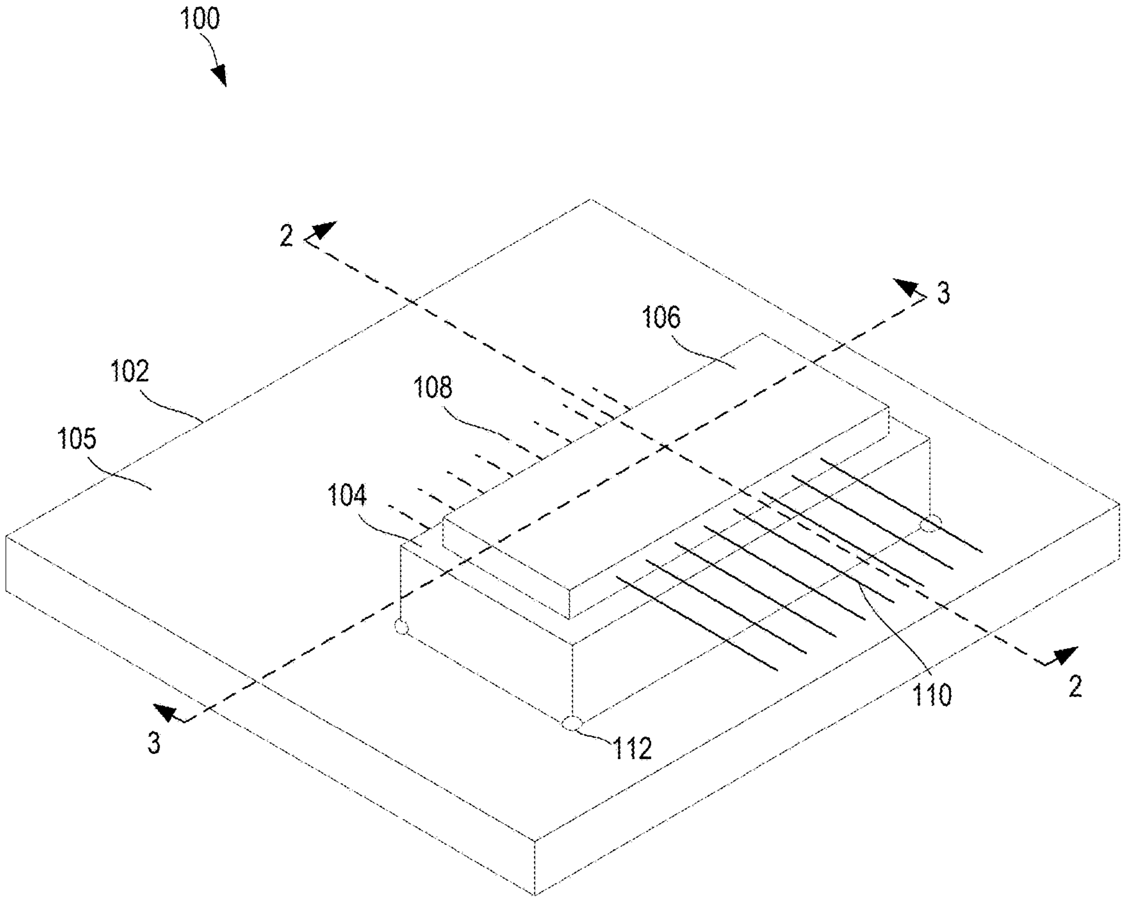
FIG. 1 is an isometric view of a system including a photonic integrated circuit die.

In various embodiments disclosed herein, an optical connector interface is secured to a photonic integrated circuit (PIC) die to facilitate coupling into and out of waveguides of the PIC die. In one illustrative embodiment, an optical connector interface includes a lens array, a cavity for an optical isolator, and a cavity that an optical connector can be plugged into. Other embodiments are disclosed, as discussed below in more detail.

As used herein, the phrase "communicatively coupled" refers to the ability of a component to send a signal to or receive a signal from another component. The signal can be any type of signal, such as an input signal, an output signal, or a power signal. A component can send or receive a signal to another component to which it is communicatively coupled via a wired or wireless communication medium (e.g., conductive traces, conductive contacts, air). Examples of components that are communicatively coupled include integrated circuit dies located in the same package that communicate via an embedded bridge in a package substrate and an integrated circuit component attached to a printed circuit board that send signals to or receives signals from other integrated circuit components or electronic devices attached to the printed circuit board.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact, and "coupled" may indicate elements co-operate or interact, but they may or may not be in direct physical or electrical contact. Furthermore, the terms "comprising," "including," "having," and the like, as used with respect to embodiments of the present disclosure, are synonymous. Terms modified by the word "substantially" include arrangements, orientations, spacings, or positions that vary slightly from the meaning of the unmodified term. For example, the central axis of a magnetic plug that is substantially coaxially aligned with a through hole may be misaligned from a central axis of the through hole by several degrees. In another example, a substrate assembly feature, such as a through width, that is described as having substantially a listed dimension can vary within a few percent of the listed dimension.

It will be understood that in the examples shown and described further below, the figures may not be drawn to scale and may not include all possible layers and/or circuit components. In addition, it will be understood that although certain figures illustrate transistor designs with source/drain regions, electrodes, etc. having orthogonal (e.g., perpendicular) boundaries, embodiments herein may implement such boundaries in a substantially orthogonal manner (e.g., within +/−5 or 10 degrees of orthogonality) due to fabrication methods used to create such devices or for other reasons.

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

As used herein, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

As used herein, the term "adjacent" refers to layers or components that are in physical contact with each other. That is, there is no layer or component between the stated adjacent layers or components. For example, a layer X that is adjacent to a layer Y refers to a layer that is in physical contact with layer Y.

Figure 2:
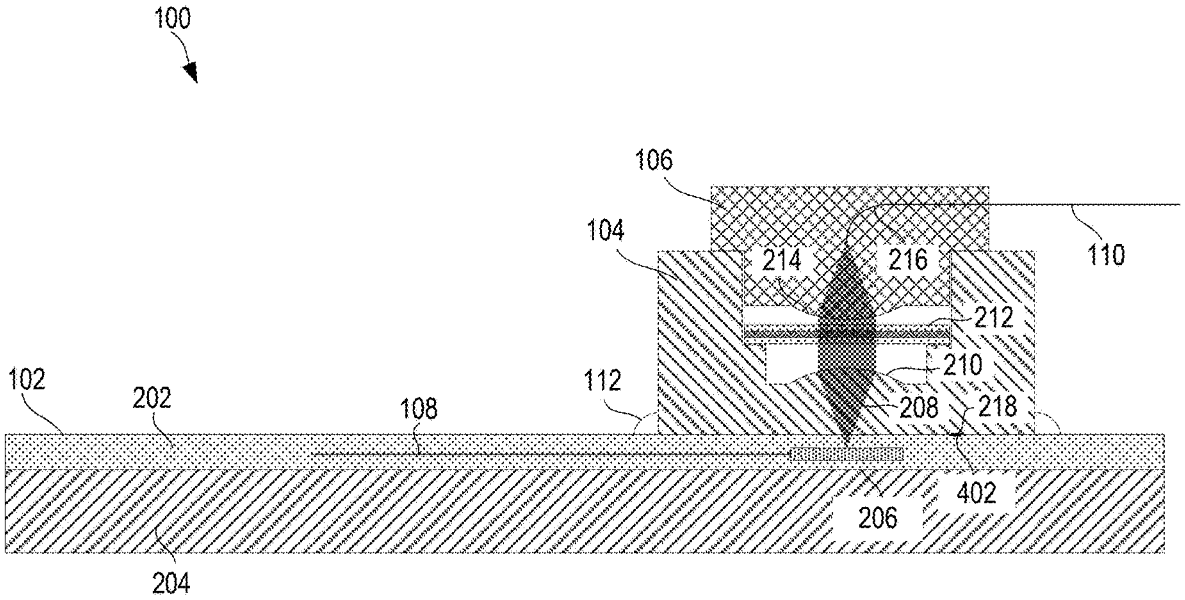
FIG. 2 is a cross-sectional view of the system of FIG. 1.
Figure 3:
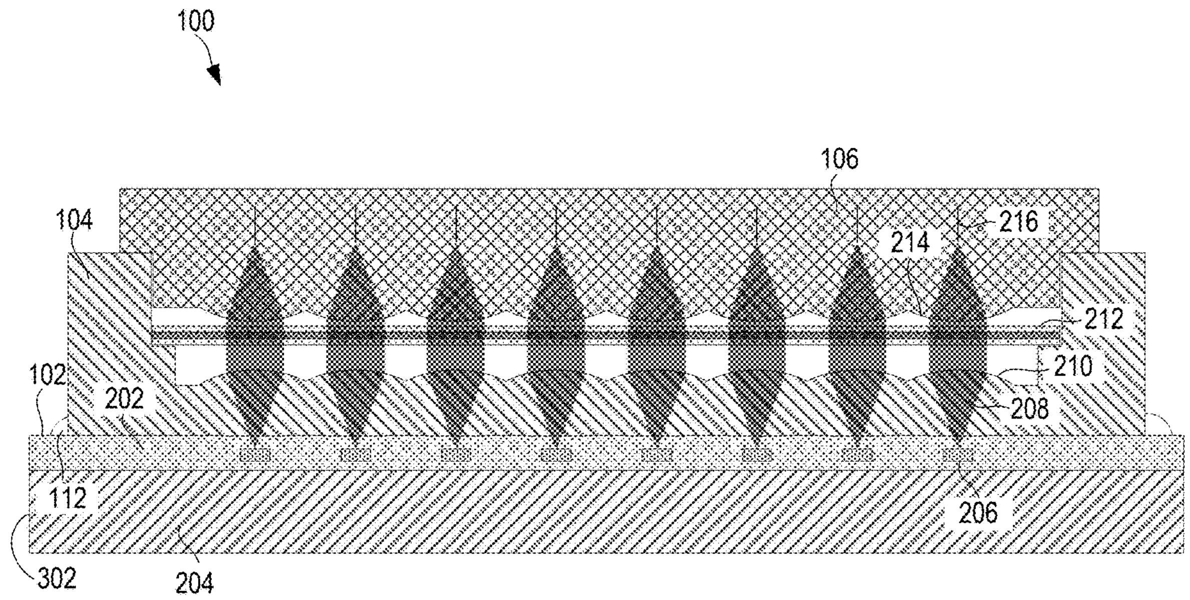
FIG. 3 is a cross-sectional view of the system of FIG. 1.
Figure 4:
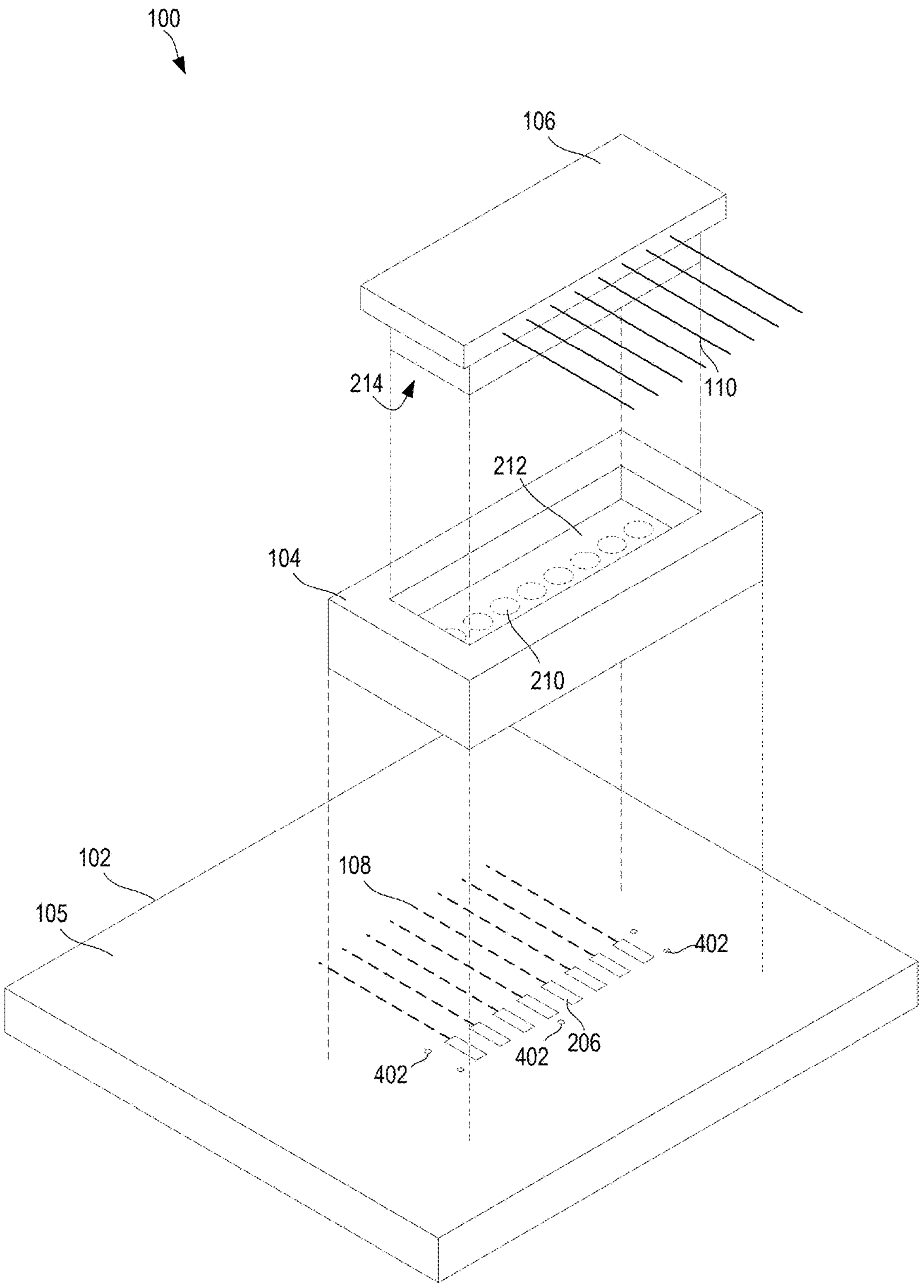
FIG. 4 is an exploded view of the system of FIG. 1.

Referring now to FIGS. 1-4, in one embodiment, a system 100 includes a photonic integrated circuit (PIC) die 102. FIG. 1 shows an isometric view of the system 100, FIGS. 2 and 3 each show a cross-sectional view of the system 100, and FIG. 4 shows an exploded view of the system 100. The illustrative PIC die 102 is configured to generate, detect, and/or manipulate light. One or more waveguides 108 are defined in the PIC die 102 to guide light. Vertical couplers 206 (see FIG. 2) redirect the light from the waveguides 108 to a beam 208 coming out of the top surface 105 of the PIC die 102. It should be appreciated that, as used herein, the "top surface" 105 refers to an outer surface of the PIC die 102 (or other PIC dies disclosed herein) and may, in some embodiments, be, e.g., a bottom surface or side surface of the PIC die 102, depending on the orientation of the PIC die 102. The illustrative PIC die 102 is much thinner in one dimension than the other two, and the top surface 105 refers to a surface extending along the two larger dimensions of the PIC die 102. Similarly, a "side surface" of the PIC die 102 (or other PIC dies disclosed herein) refers to a surface of the PIC die 102 other than the top surface 105 and may not be on the "side" of the PIC die 102, depending on the orientation of the PIC die 102. Unless noted otherwise, the side surface 302 of the PIC die 102 is at an angle relative to the top surface, such as an angle of 90°.

An optical connector interface 104 is positioned on the top surface 105 of the PIC die 102, over the vertical couplers 206. The optical connector interface 104 includes an array of lenses 210 (see FIGS. 2 & 3). Each lens 210 is aligned with one of the vertical couplers 206. In the illustrative embodiment, each lens 210 collimates the beam 208 from the corresponding vertical couplers 206 (or focuses the beam 208 into the corresponding vertical couplers 206). Epoxy 112 secures the optical connector interface 104 to the PIC die 102.

The illustrative optical connector interface 104 defines a cavity, into which an optical isolator 212 can be placed. The illustrative optical isolator 212 includes two linear polarizers rotated 45° relative to each other in between a Faraday rotator that rotates light at the operational frequency of a laser or other light source by 45°. The optical isolator 212 allows light at the design wavelength to pass through one way but not the other.

An optical connector 106 can mate with the optical connector interface 104, with part of the optical connector 106 extending into the cavity defined by the optical connector interface 104, as shown in FIGS. 2 and 3. In the illustrative embodiment, the optical connector 106 can simply be plugged into the optical connector interface 104. The optical connector 106 may be held in place by a clip, fastener, or other retaining device. In the illustrative embodiment, the optical connector 106 is removable from the optical connector interface 104. In some embodiments, the optical connector 106 may be permanently connected to optical connector interface 104. In such embodiments, the optical connector 106 may be epoxied or otherwise permanently attached to the optical connector interface 104.

The optical connector 106 includes an array of lenses 214. When the optical connector 106 is mated with the optical connector interface 104, each lens 214 of the optical connector 106 is aligned to a lens 210 of the optical connector interface 104. Each beam 208 is focused by the lens 214 to a fiber 216 positioned in the optical connector interface 104. The fiber 216 internal to the optical connector 106 leads to an external fiber 110.

In the illustrative embodiment and as discussed in more detail below, the optical connector interface 104 is positioned on the surface of the PIC die 102 using a pick-and-place machine. The PIC die 102 may include one or more fiducials 402 (see FIG. 4) and the optical connector interface 104 may include one or more fiducials 218, which may be used by a pick-and-place machine to place the optical connector interface 104. The fiducials 402, 218 may be embodied as, e.g., a dot, a line, or other structure that indicates a location of a particular part of the PIC die 102. Any PIC die and/or optical connector interface disclosed herein may have any suitable fiducials. The pick-and-place machine can align the lenses 210 of the optical connector interface 104 with a high precision, such as a misalignment of less than 3-0.3 micrometers at 3 sigma. In the illustrative embodiment, the misalignment of the placement of the optical connector interface 104 is less than the minimum waist of the beam 208 when it is directed vertical by the vertical coupler 206.

Figure 5:
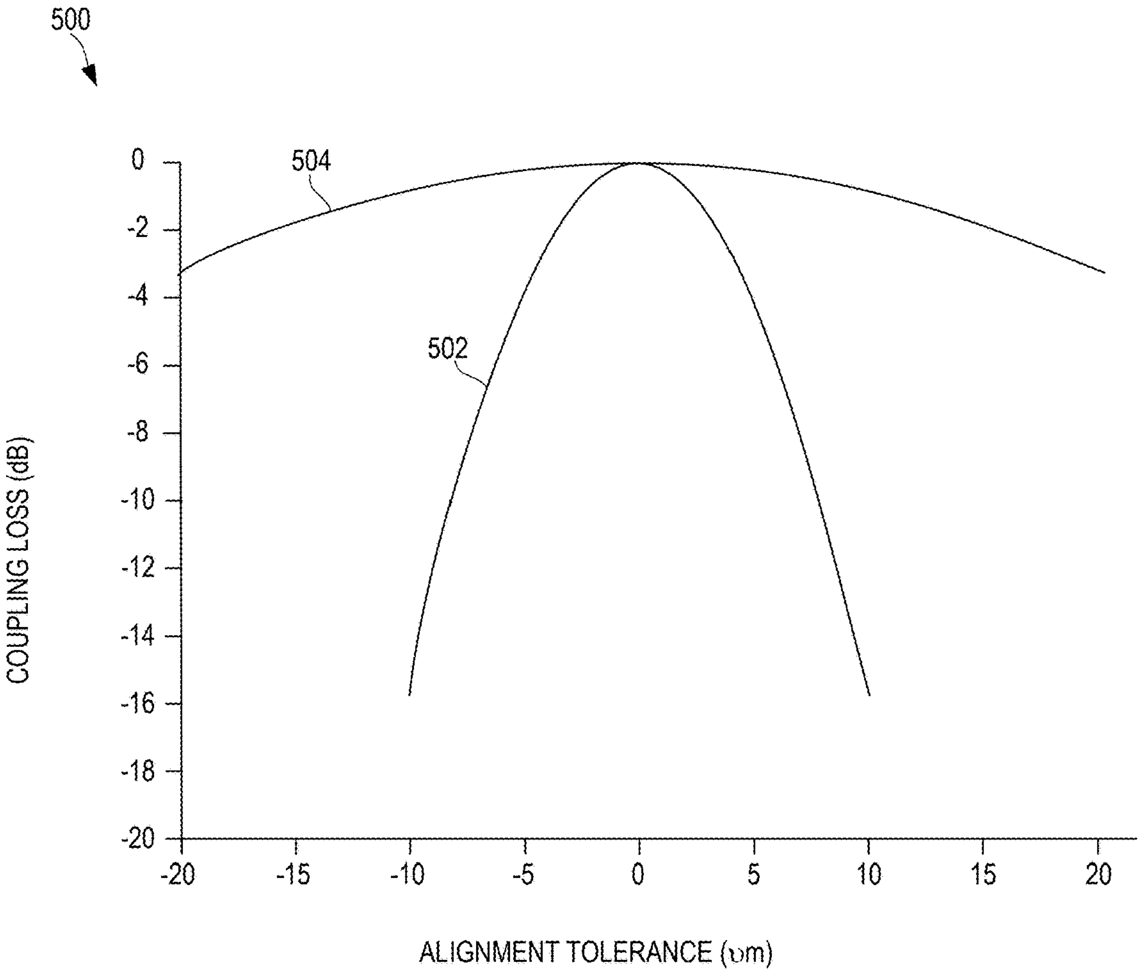
FIG. 5 is a graph showing an alignment tolerance of a component of FIG. 1.

It should be appreciated that, with the lens 210 positioned relative to the vertical coupler 206 with high precision (and the lens 214 positioned relative to the fiber 216 with high precision), the lens 214 does not need to be positioned relative to the lens 210 with high precision in order to have good coupling of light from a waveguide 108 to the corresponding fiber 216. As such, coupling of light into the fiber 216 is relatively insensitive to the positional alignment of the optical connector 106 relative to the optical connector interface 104. For example, FIG. 5 depicts a plot 500 showing simulated coupling loss as a function of alignment tolerance. For an uncollimated beam (i.e., a beam coming out of the vertical coupler 206 without any lens), coupling loss corresponds to the curve 502, with a 1 dB and 3 dB loss corresponding to a misalignment of 3 micrometers and 4.5 micrometers, respectively. For a collimated beam with a 25 micrometer mode field diameter, coupling loss corresponds to the curve 504, with a 1 dB and 3 dB loss corresponding to a misalignment of 11 micrometers and 20 micrometers, respectively.

The PIC die 102 may include one or more lasers or other light sources, detectors, amplitude and/or phase modulators, filters, splitters, amplifiers, etc. In one embodiment, the PIC die 102 may receive electrical signals, such as from another component that the PIC die 102 is mounted on, and generate a corresponding optical signal in a waveguide 108 to be sent to a remote device. Additionally or alternatively, the PIC die 102 may receive optical signals in a waveguide 108 and generate a corresponding electrical signal, which may be sent to another component on the PIC die 102. The PIC die 102 may operate at any suitable optical wavelength, such as 1,200-1,800 nanometers. In some embodiments, the PIC die 102 may operate at a higher or lower wavelength, such as ultraviolet, visible, near infrared, far infrared, etc. In the illustrative embodiment, the PIC die 102 operates in the near infrared at a wavelength that is transparent in silicon.

In the illustrative embodiment, the PIC die 102 has an oxide layer 202 on a substrate layer 204 (see, e.g., FIG. 2). In the illustrative embodiment, the waveguides 108 are defined in the oxide layer 202. The illustrative waveguides 108 are silicon waveguides in a silicon oxide layer 202. The higher index of refraction of the silicon relative to the silicon dioxide confines the light to the waveguides 108. In other embodiments, the waveguides 108 may be made from a different material and/or may be defined in a different material. In some embodiments, the waveguides 108 may expand in one or both dimensions to allow the light to expand at the vertical coupler 206. Each waveguide 108 may have any suitable dimensions, such as a width and/or height of 0.1-10 micrometers. In the illustrative embodiment, each waveguide 1086 is square. In other embodiments, the waveguide 108 may have a different shape, such as a rectangular shape. The PIC die 102 may include any suitable number of waveguides 108 coupling to the optical connector 106, such as 1-32 waveguides 116. Of course, the PIC die 102 may include additional waveguides internally.

The waveguides 108 may be separated by any suitable distance, such as 50-1,000 micrometers. The waveguides 108 are spaced apart enough that the beams 208 projected from the vertical couplers 206 do not overlap once collimated by the lenses 210. Each waveguide 108 may support one or more channels, such as 1-50 channels. Each channel may have any suitable bandwidth, such as 0.1-1,000 gigabits per second.

In the illustrative embodiment, the lenses 210, 214 are spherical. In other embodiments, the lenses 210, 214 may have aspherical surfaces that may correct for aberrations such as spherical aberration. The lenses 210, 214 of each lens array may have any suitable spacing between them, such as 50-1,000 micrometers, measured from the center of one lens 210, 214 to the next lens 210, 214. The lenses 210, 214 may have any suitable focal length, such as 1-25 millimeters. The lenses 210, 214 may collimate light from the waveguides 108 to a beam with any suitable mode field diameters, such as 20-1,000 micrometers.

The optical connector interface 104 and/or the optical connector 106 may be made from any suitable transmissive material, such as glass, plastic, fused silica, silicon, etc. The optical connector interface 104 and/or the optical connector 106 may be made in any suitable manner, such as molding, machining, etching, 3D printing, laser direct writing, etc.

In some embodiments, some or all of the optical surfaces (such as the lens 210, lens 214, etc.) may have anti-reflection or other impedance-matching coatings in order to reduce reflections. Similar coatings may be applied to any suitable optical surface in any embodiment disclosed herein.

Figure 6:
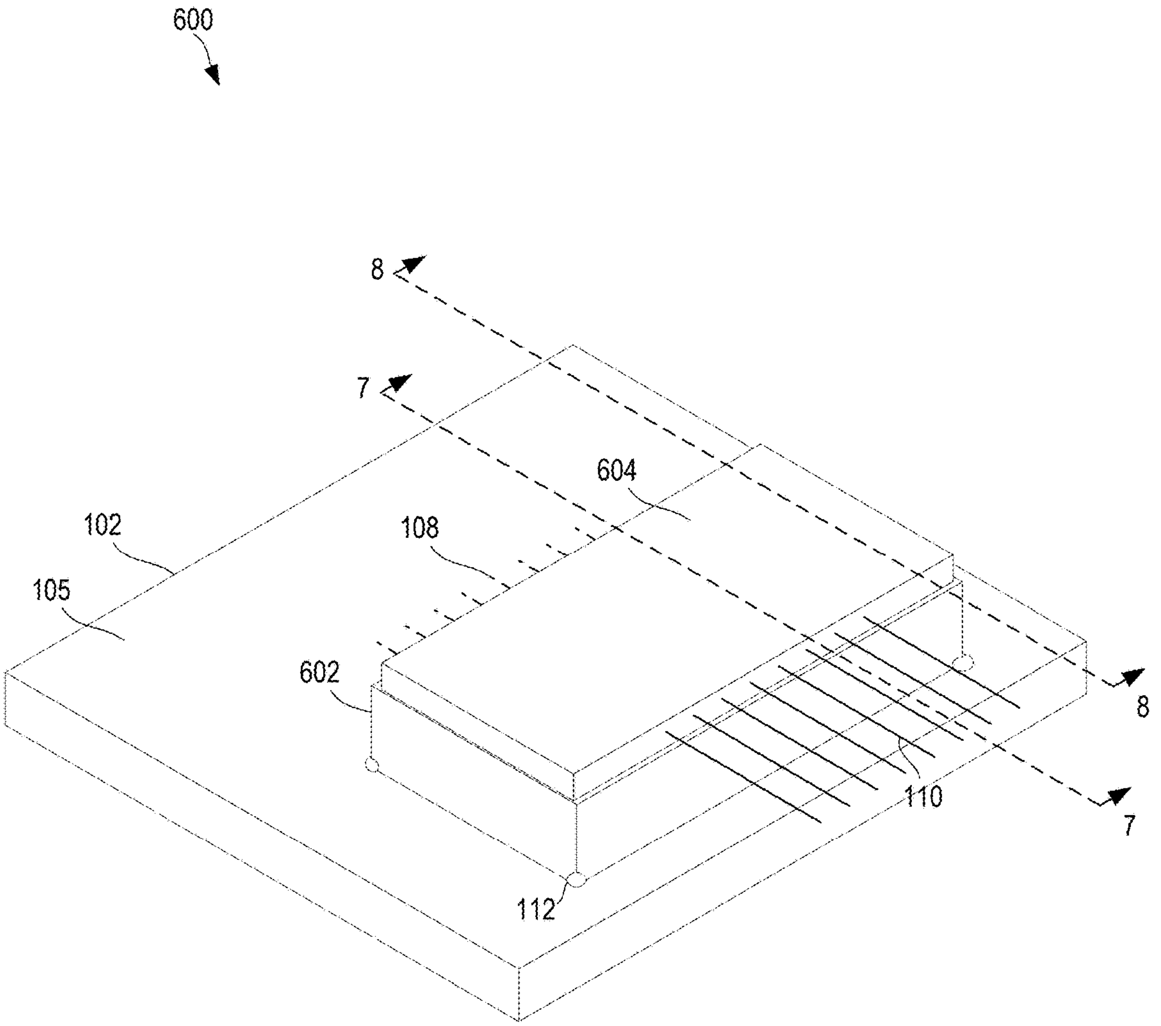
FIG. 6 is an isometric view of a system including a photonic integrated circuit die.
Figure 7:
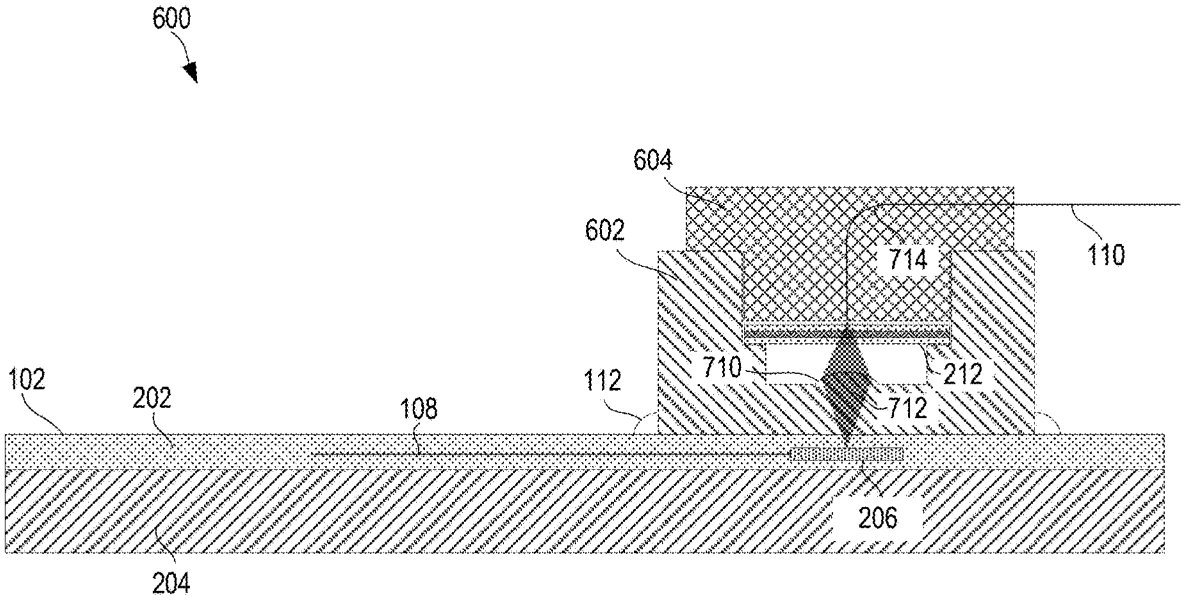
FIG. 7 is a cross-sectional view of the system of FIG. 6.
Figure 8:
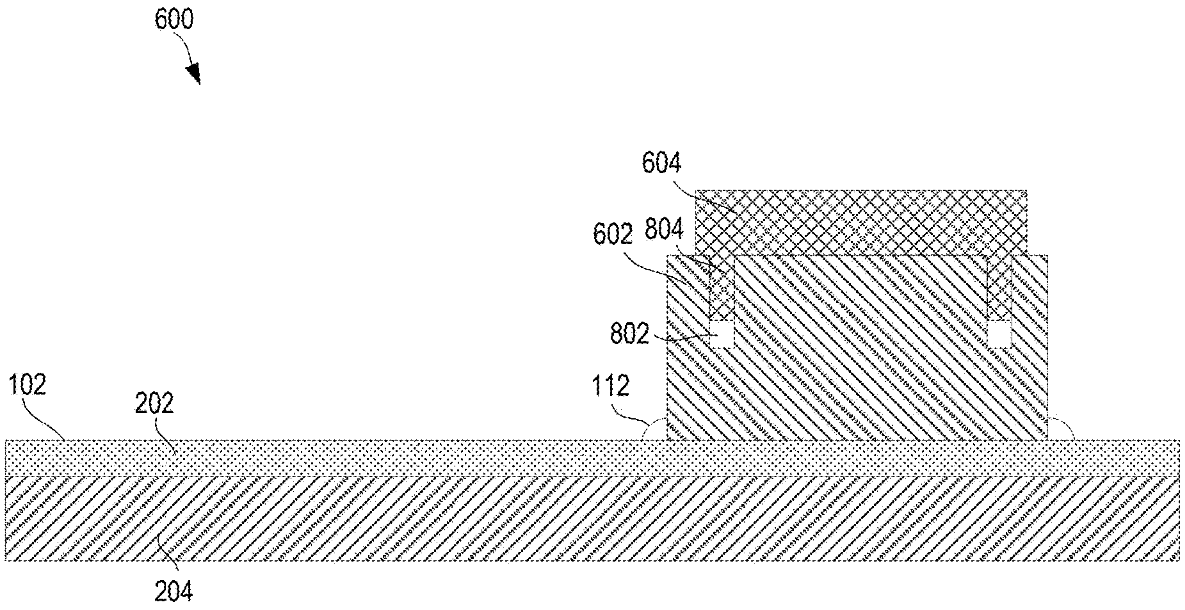
FIG. 8 is a cross-sectional view of the system of FIG. 6.
Figure 9:
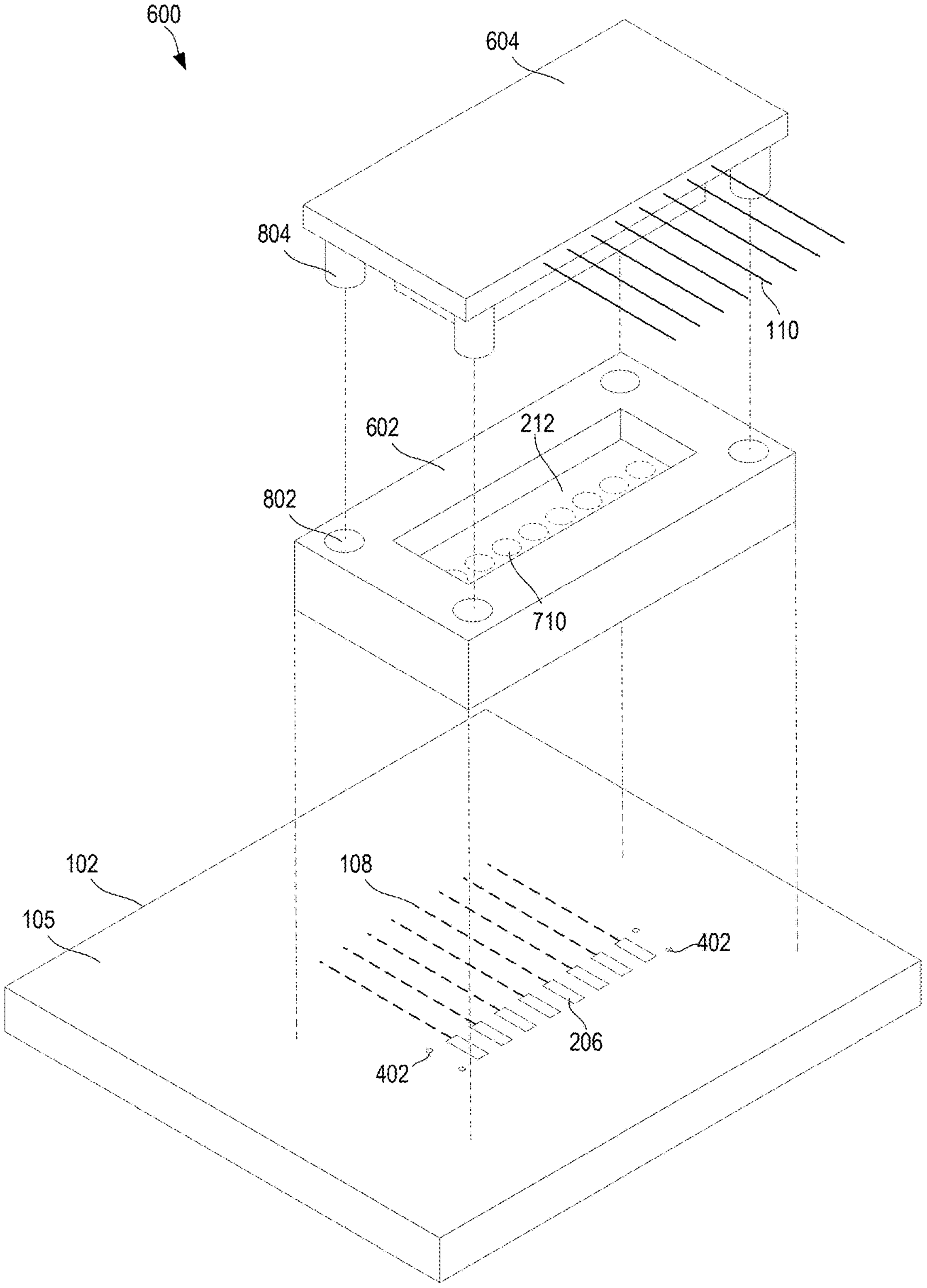
FIG. 9 is an exploded view of the system of FIG. 6.

Referring now to FIGS. 6-9, in one embodiment, a system 600 includes a photonic integrated circuit (PIC) die 102, an optical connector interface 602, and an optical connector 604. FIG. 6 shows an isometric view of the system 600, FIGS. 7 and 8 each show a cross-sectional view of the system 600, and FIG. 9 shows an exploded view of the system 600. Some of the components of the system 600 (and other systems, such as the systems 1000, 1100, 1200, 1500, etc.), such as the PIC die 102, the waveguides 108, the vertical coupler 206, the optical isolator 212, etc., may be similar to or the same as a corresponding component in the system 100, a description of which will not be repeated in the interest of clarity. Additionally, some components such as the optical connector interface 602 and optical connector 604 may have similar material, dimensions, function, etc., as the optical connector interface 104 and optical connector 106.

The illustrative optical connector interface 602 has one or more alignment holes 802 (see FIGS. 8 and 9) that one or more alignment rods 804 of the optical connector 604 mate with, aligning the optical connector 604 (and optical fiber 714) to the optical connector interface 602 (and beam 712). The alignment rods 804 may be made of the same material as the optical connector 604 or may be a different material, such as a metal or ceramic. In the illustrative embodiment, the alignment rods 804 align the optical connector 604 to the optical connector interface 602 with a high precision, such as a misalignment of less than 3-0.3 micrometers.

The optical connector interface 602 includes one or more lenses 710, with a lens 710 for each waveguide 108 in the PIC die 102. In the illustrative embodiment, the lenses 710 focus light from the vertical coupler 206 directly to the fiber 714 in the optical connector 604. In other embodiments, the array of lenses 710 can collimate the beams 712, and a lens in the optical connector 604 can include a lense to focus the beam 712 to the fiber. It should be appreciated that the alignment holes 802 and alignment rods 804 may be included in any suitable embodiment disclosed herein, such as the system 100, 1000, 1100, 1200, 1500, 1800, 1900, 2000, etc.

Figure 10:
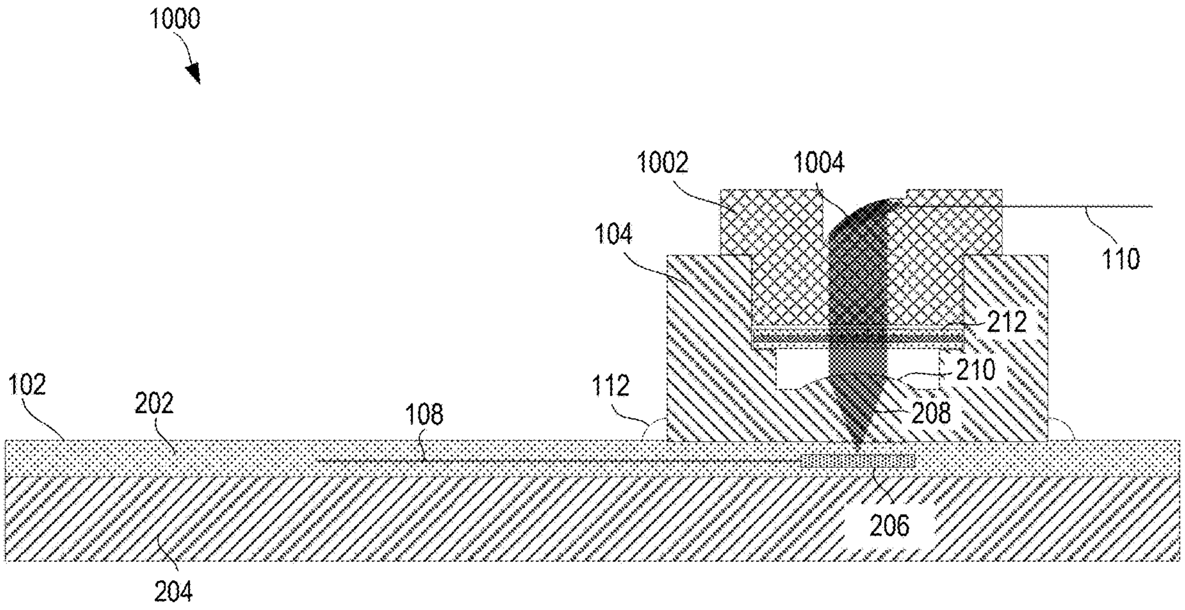
FIG. 10 is a cross-sectional view of a system including a photonic integrated circuit die.

Referring now to FIG. 10, in one embodiment, a system 1000 includes a photonic integrated circuit (PIC) die 102, an optical connector interface 104, and an optical connector 1002. FIG. 10 shows a cross-sectional view of the system 1000. An isometric view and exploded view of the system 1000 would be similar to that shown in FIG. 1 and FIG. 4.

Instead of using a lens 214 in the optical connector 106 to focus the beam 208, the optical connector 1002 uses a mirror 1004 to both focus the beam 208 and direct it to the optical fiber 110. The mirror 1004 may reflect based on total internal reflection. The focal length of the mirror 1004 may be similar to that of the lens 214.

Figure 11:
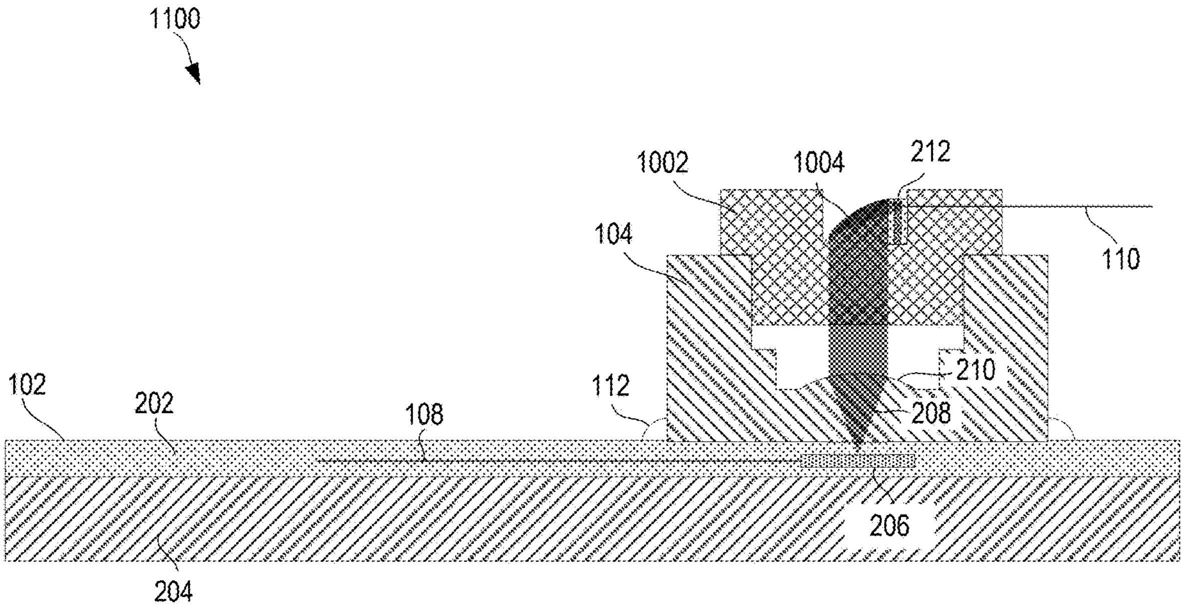
FIG. 11 is a cross-sectional view of a system including a photonic integrated circuit die.

Referring now to FIG. 11, in one embodiment, a system 1100 is similar to the system 1000, but instead of positioning the optical isolator 212 between the lens 210 and the optical connector 1002, the optical isolator 212 is positioned between the mirror 1004 and the optical fiber 110. One advantage of this approach is that reflections off the surface of the optical isolator will not be reflected back into the waveguides 108.

Figure 12:
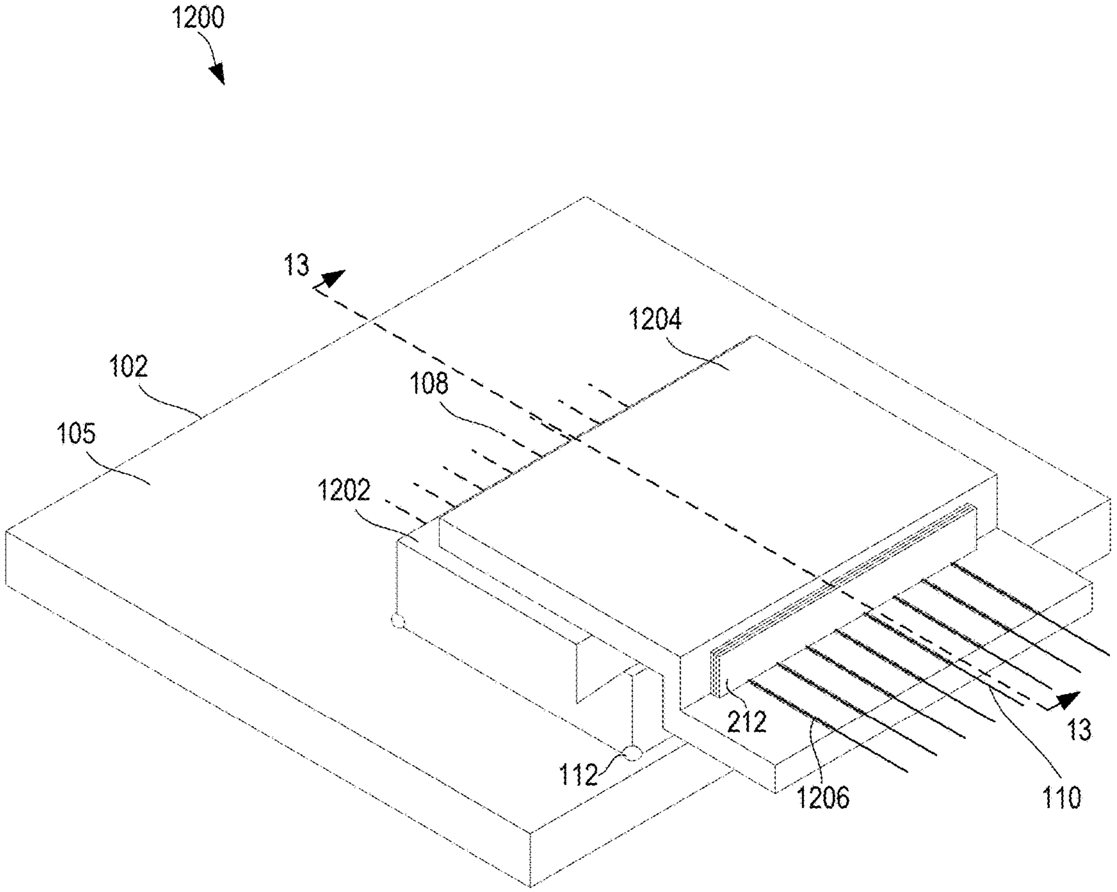
FIG. 12 is an isometric view of a system including a photonic integrated circuit die.
Figure 13:
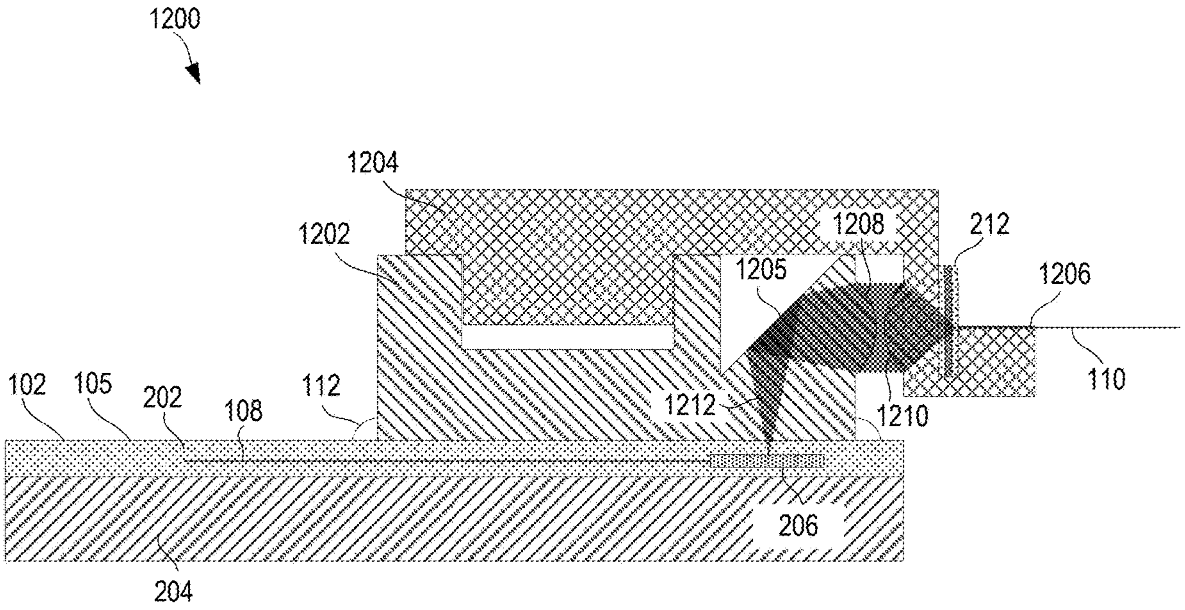
FIG. 13 is a cross-sectional view of the system of FIG. 12.
Figure 14:
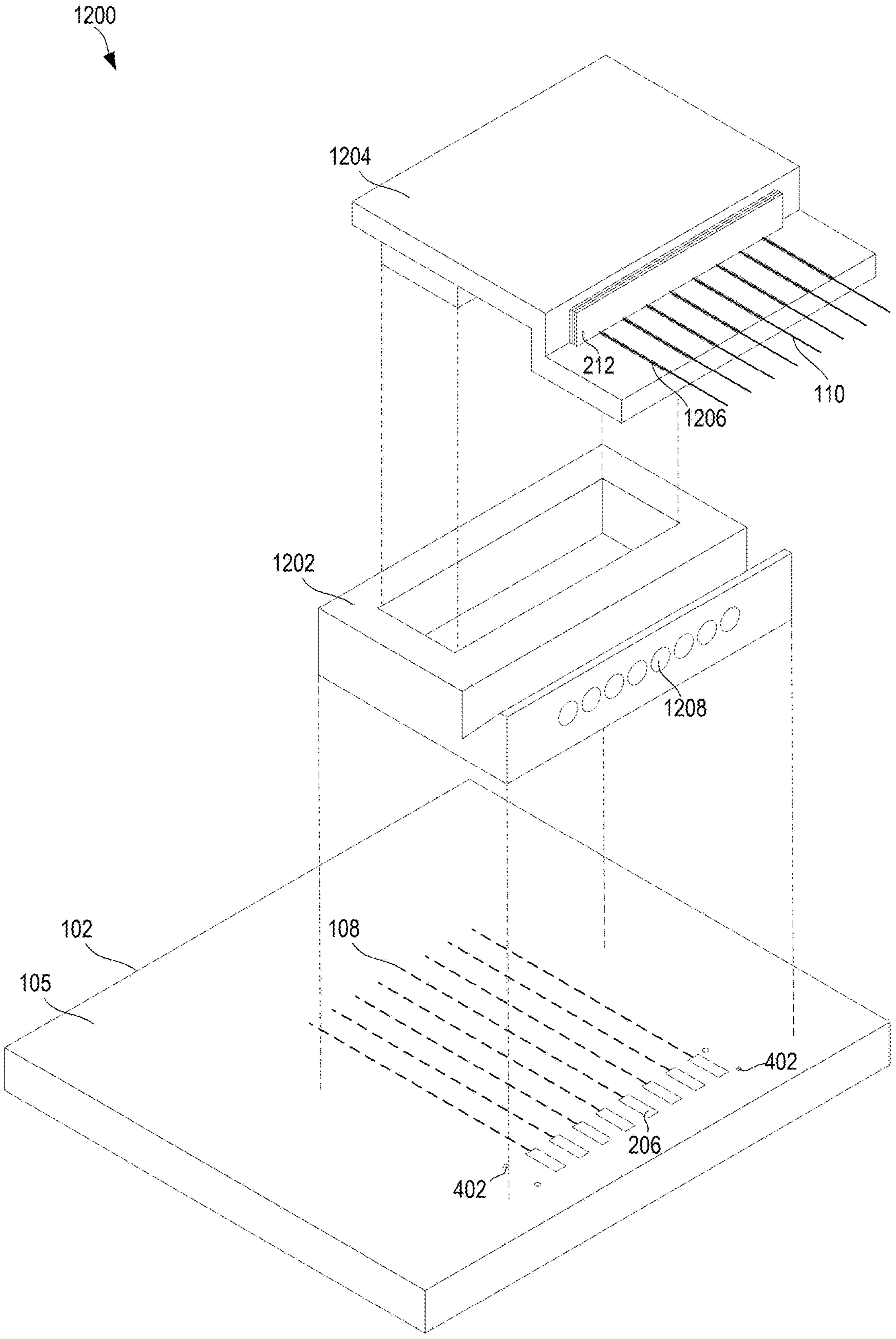
FIG. 14 is an exploded view of the system of FIG. 12.

Referring now to FIGS. 12-14, in one embodiment, a system 1200 includes a photonic integrated circuit (PIC) die 102, an optical connector interface 1202, and an optical connector 1204. FIG. 12 shows an isometric view of the system 1200, FIG. 13 shows a cross-sectional view of the system 1200, and FIG. 14 shows an exploded view of the system 1200.

The optical connector interface 1202 has a flat total internal reflection (TIR) mirror 1205 reflecting a beam 1212 from the vertical coupler 206 to a lens 1208 positioned to collimate the beam 1212 in a direction parallel to the top surface 105 of the PIC die 102. In the illustrative embodiment, the flat TIR mirror 1205 operates by total internal reflection. In some embodiments, a metal or other reflective coating may be applied to form the mirror 1205 to improve reflectivity. The beam 1212 from each waveguide 108 is reflected from the TIR mirror 1205 and collimated by the corresponding lens 1208. The lenses 1208 may be similar to the lens 210, except for their orientation.

The optical connector 1204 can be plugged into the optical connector interface 1202 in a similar manner as the optical connector 106. The optical connector 1204 has an array of lenses 1210 opposite the array of lenses 1208 to focus each collimated beam 1212 to a fiber 110. Each fiber 110 is positioned in a v-groove 1206. In the illustrative embodiment, the optical isolator 212 is positioned between the lenses 1210 and the optical fibers 110. In other embodiments, the optical isolator 212 may be positioned in a different location.

Figure 15:
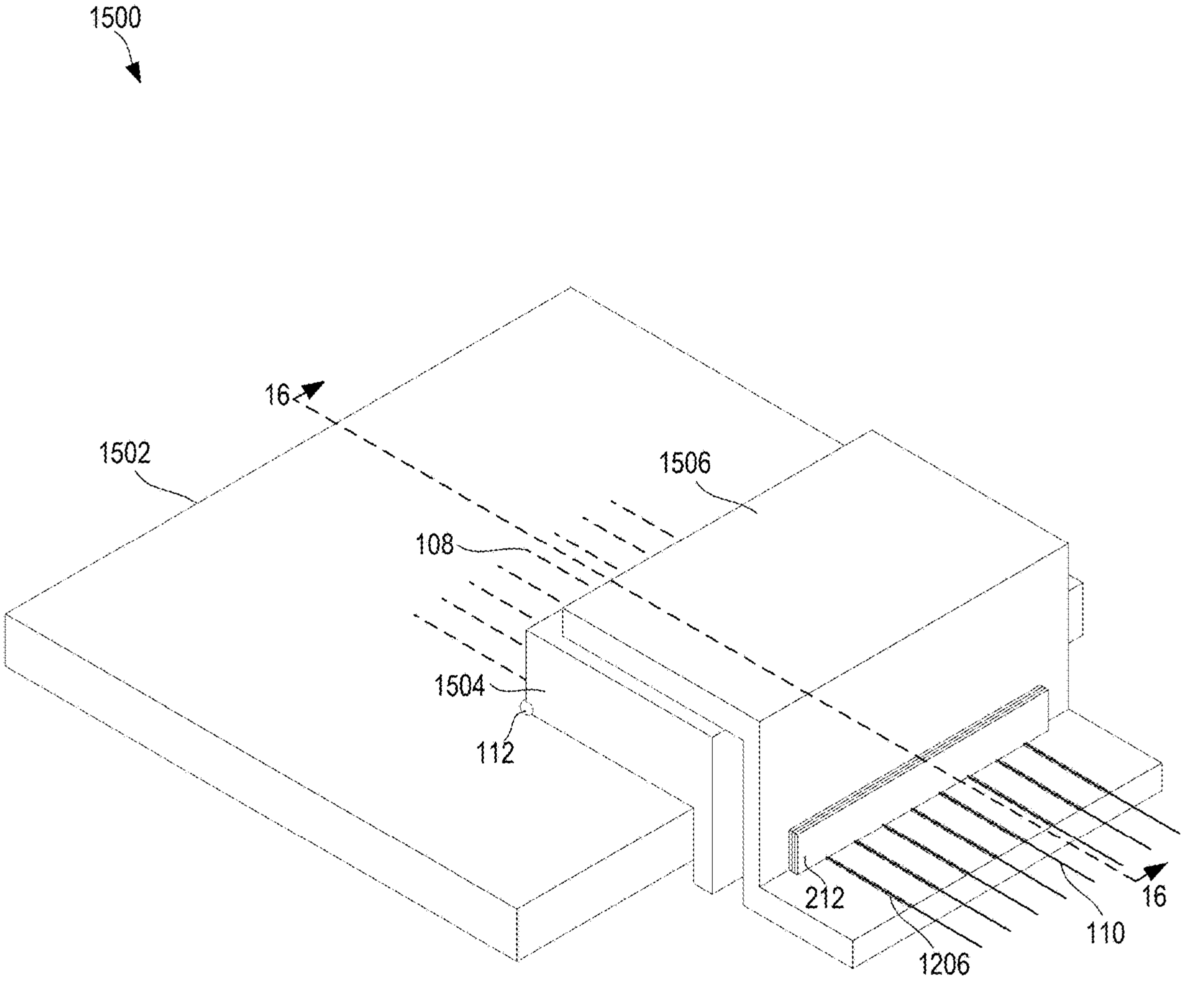
FIG. 15 is an isometric view of a system including a photonic integrated circuit die.
Figure 16:
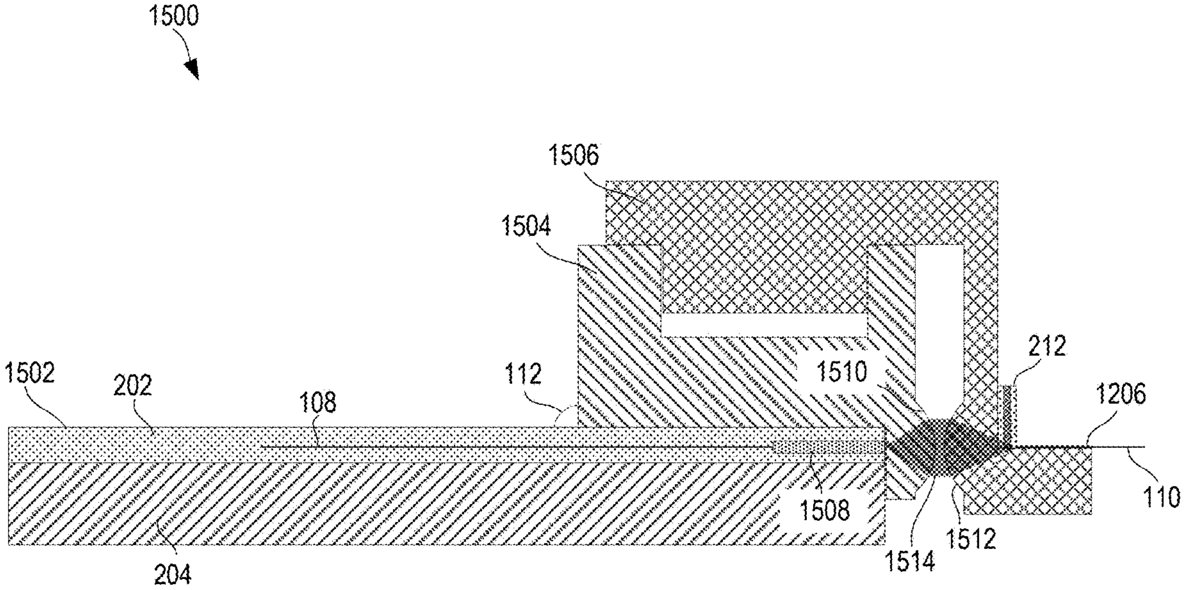
FIG. 16 is a cross-sectional view of the system of FIG. 15.
Figure 17:
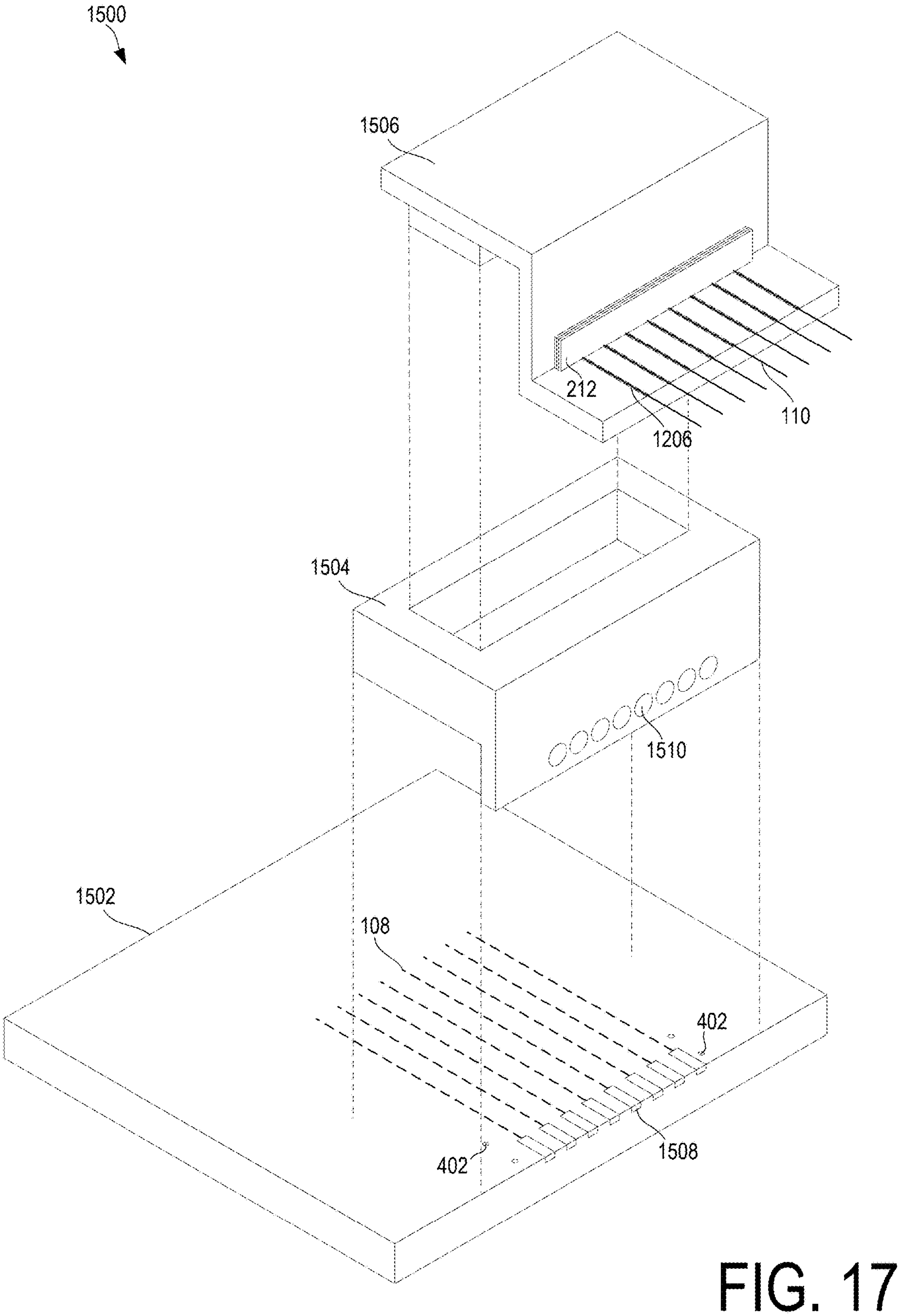
FIG. 17 is an exploded view of the system of FIG. 15.

Referring now to FIGS. 15-17, in one embodiment, a system 1500 includes a photonic integrated circuit (PIC) die 1502, an optical connector interface 1504, and an optical connector 1506. FIG. 15 shows an isometric view of the system 1500, FIG. 16 shows a cross-sectional view of the system 1500, and FIG. 17 shows an exploded view of the system 1500.

The PIC die 1502 is similar to the PIC die 102, except the waveguides 108 in the PIC die 1502 extend to the side of the PIC die 1502. In the illustrative embodiment, the waveguides 108 have an expansion region 1508 (or edge coupler 1508) in which the size of the waveguides 108 (and the mode of the light inside the waveguides 108) expands. In other embodiments, the waveguides 108 may not include an expansion region 1508.

The optical connector interface 1504 includes an array of lenses 1510 to collimate the beam 1514 coming from each waveguide 108. The optical connector 1506 includes an array of lenses 1512 to focus each beam 1514 to a corresponding fiber 110. In the illustrative embodiment, an optical isolator is placed between the lenses 1512 and the fibers 110.

Figure 18:
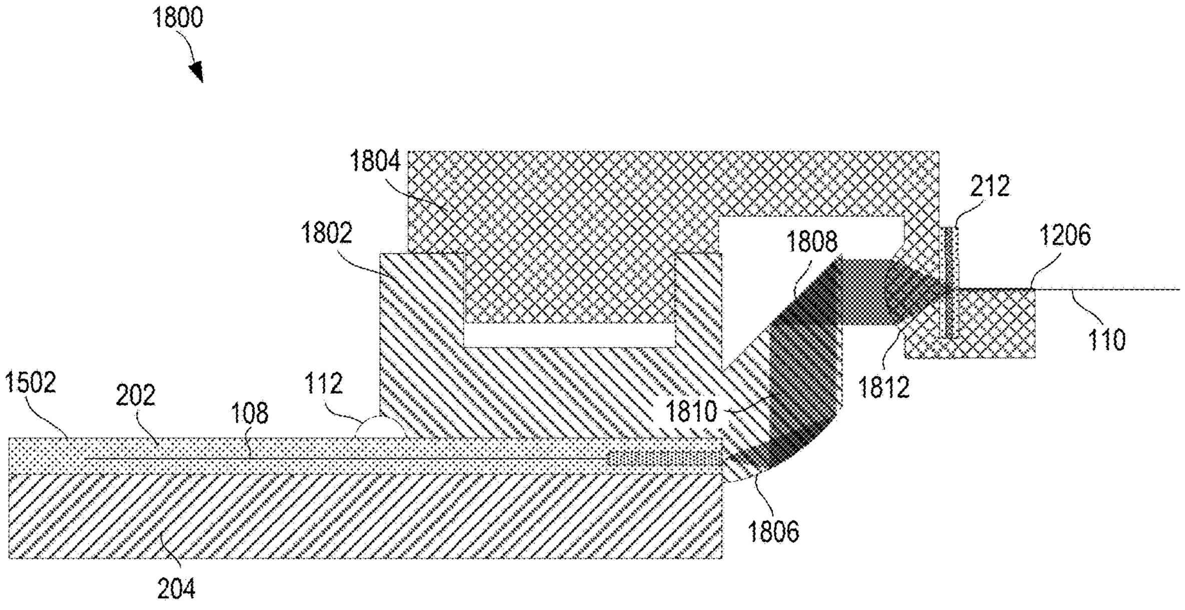
FIG. 18 is a cross-sectional view of a system including a photonic integrated circuit die.

Referring now to FIG. 18, in one embodiment, a system 1800 includes a photonic integrated circuit (PIC) die 1502, an optical connector interface 1802, and an optical connector 1804. FIG. 18 shows a cross-sectional view of the system 1800. The optical connector 1804 may plug into the optical connector interface 1802 in a similar manner as the optical connector 106 or the optical connector 604. The optical connector interface 1802 includes an array of curved TIR mirrors 1806 to both reflect each beam 1810 upwards and to collimate the beam 1810. A second array of flat TIR mirrors 1808 in the optical connector interface 1802 reflect each collimated beam 1810 to a refocusing lens 1812 to couple each beam 1820 into an optical fiber 110 of the optical connector 1804. The curved mirrors 1806, 1808 may operate based on total internal reflection, or they may have a metallic or other reflective coating applied to them. The isolateor 212 is located between the refocusing lens 1812 and fiber 110.

Figure 19:
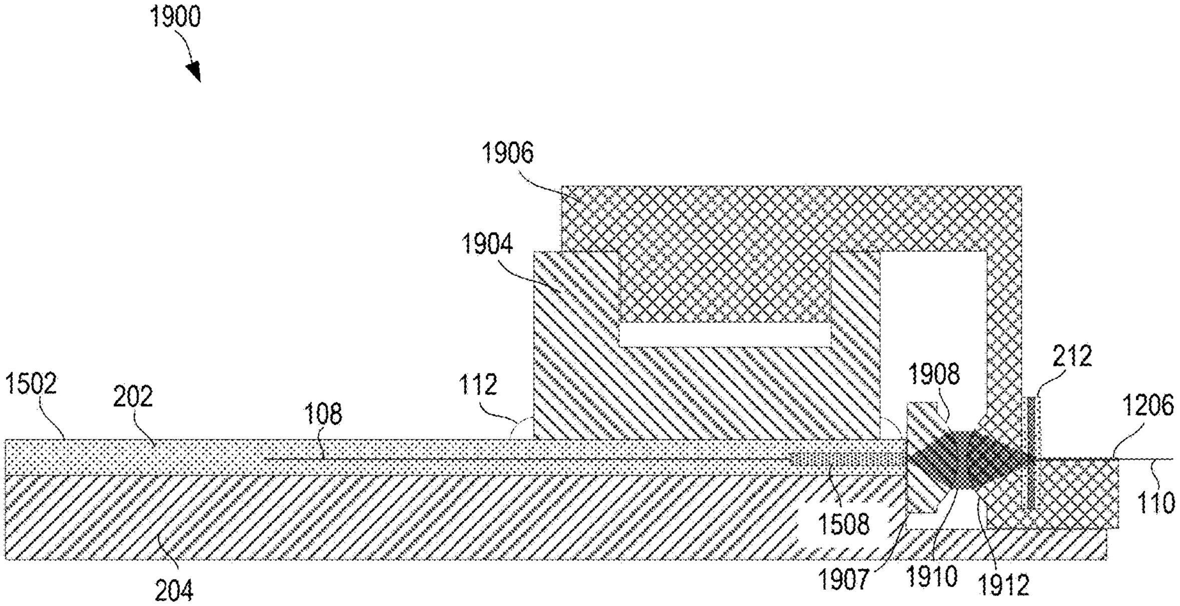
FIG. 19 is a cross-sectional view of a system including a photonic integrated circuit die.

Referring now to FIG. 19, in one embodiment, a system 1900 includes a photonic integrated circuit (PIC) die 1502, an optical connector interface 1904, and an optical connector 1906. FIG. 19 shows a cross-sectional view of the system 1900. The optical connector 1906 may plug into the optical connector interface 1904 in a similar manner as the optical connector 106 or the optical connector 604.

A lens package 1907 including an array of lenses 1908 is positioned near the end of the waveguides 108 so that the lenses 1908 collimate the beams 1910 from the waveguides. The optical connector 1906 includes lenses 1912 to focus the beams 1910 into fibers 110, as shown in FIG. 19.

Figure 20:
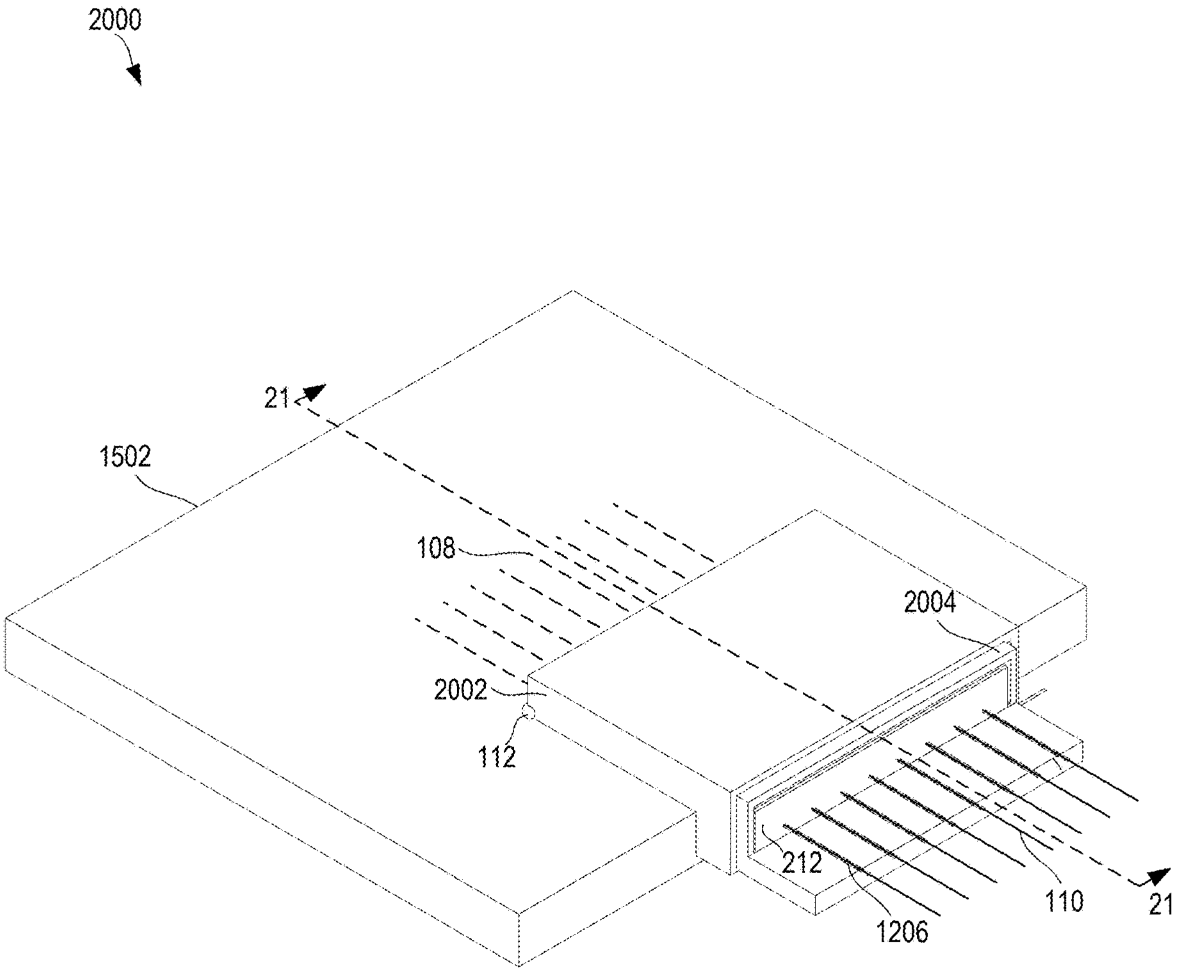
FIG. 20 is an isometric view of a system including a photonic integrated circuit die.
Figure 21:
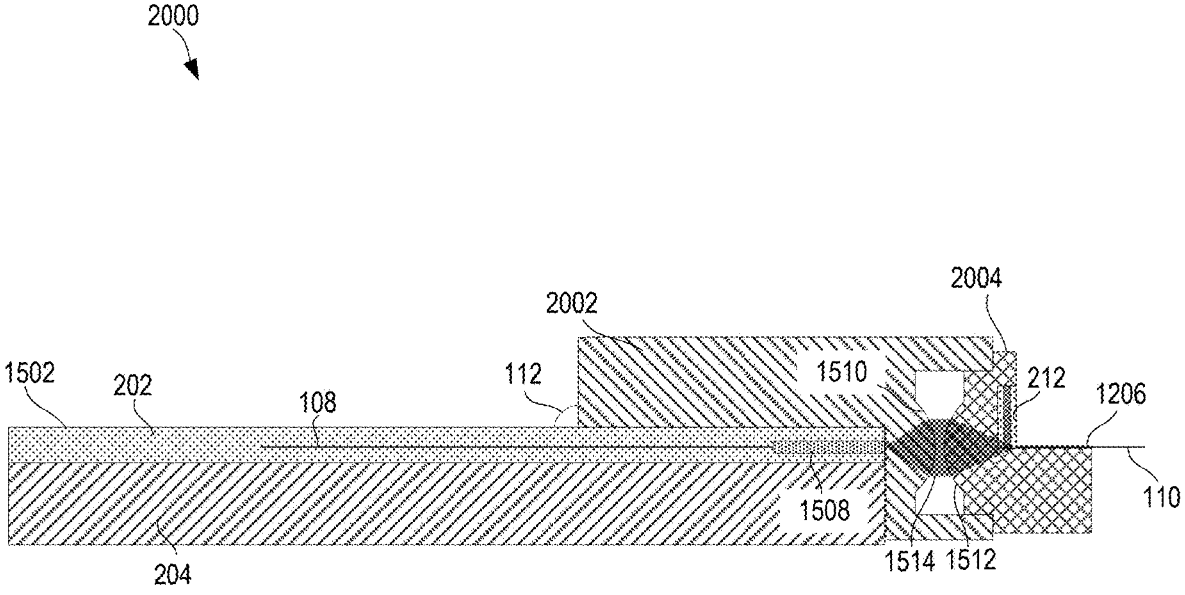
FIG. 21 is a cross-sectional view of the system of FIG. 20.
Figure 22:
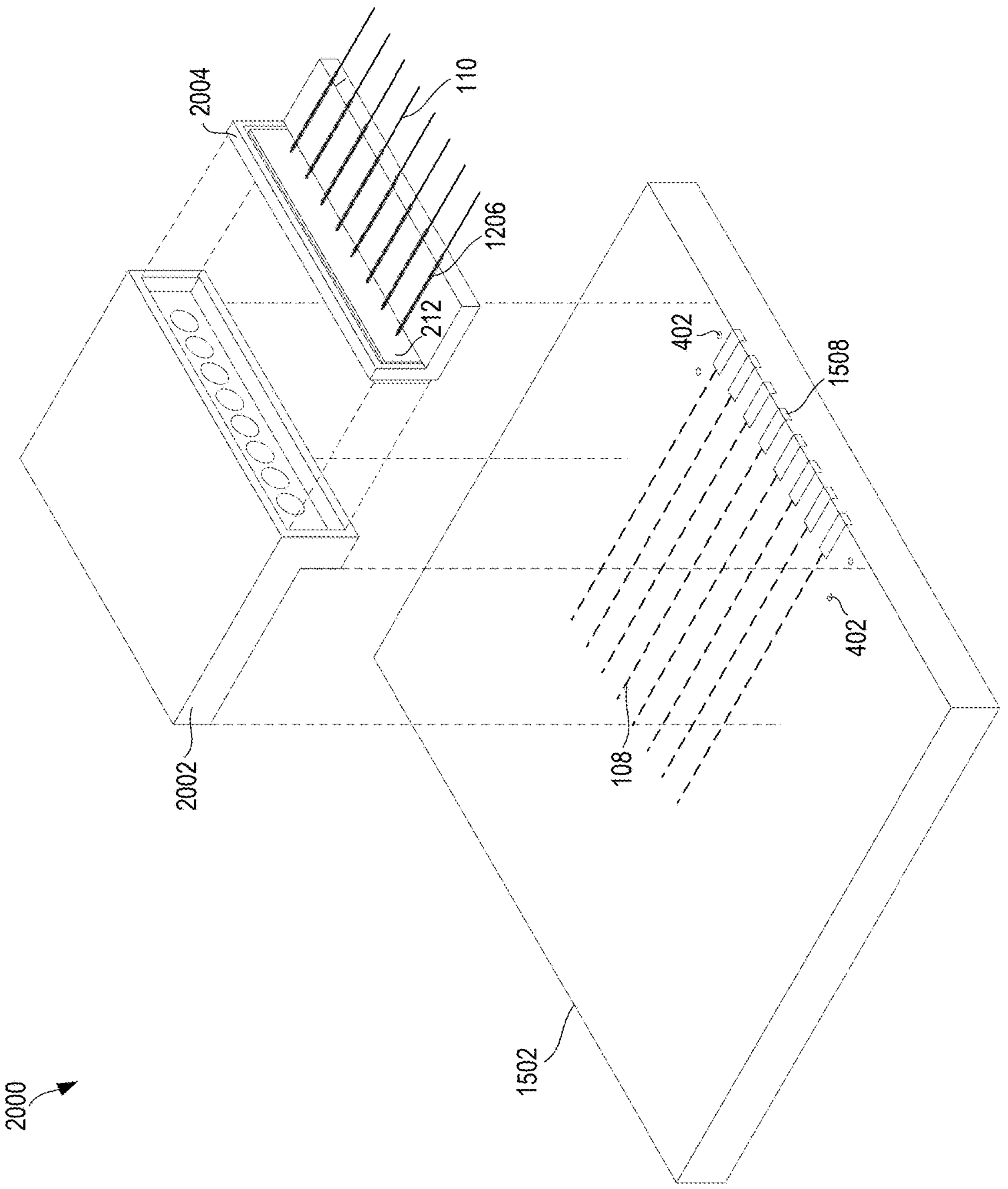
FIG. 22 is an exploded view of the system of FIG. 20.

Referring now to FIGS. 20-22, in one embodiment, a system 2000 includes a photonic integrated circuit (PIC) die 1502, an optical connector interface 2002, and an optical connector 2004. FIG. 20 shows an isometric view of the system 2000, FIG. 21 shows a cross-sectional view of the system 2000, and FIG. 22 shows an exploded view of the system 2000.

The optical connector interface 2002 includes an array of lenses 1510 to collimate the beam 1514 coming from each waveguide 108. The optical connector 2004 includes an array of lenses 1512 to focus each beam 1514 to a corresponding fiber 110.

The optical connector 2004 plugs into the optical connector interface 2002 from the side, rather than from the top, as is the case for several other embodiments described herein.

Figure 23:
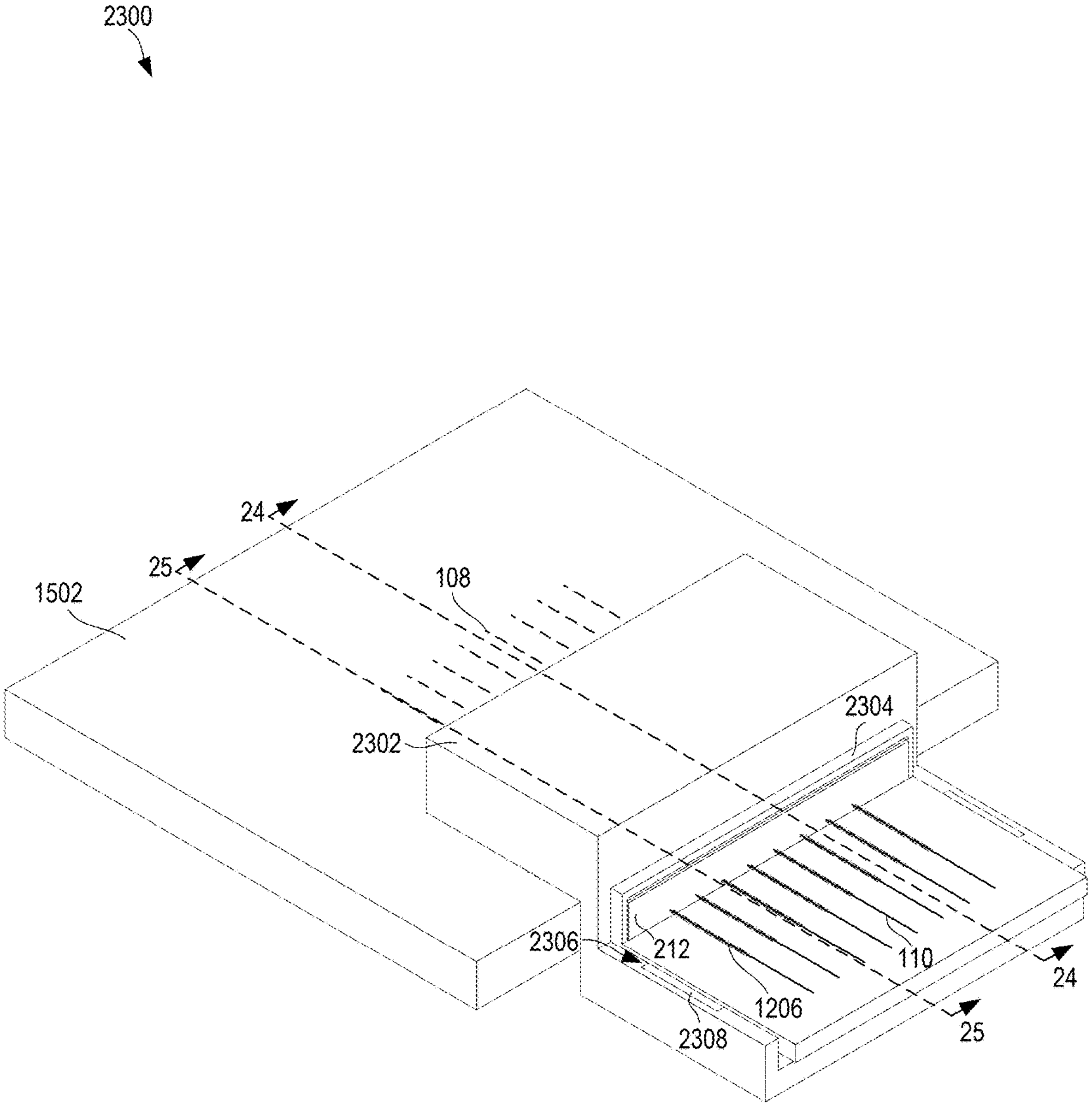
FIG. 23 is an isometric view of a system including a photonic integrated circuit die.
Figure 24:
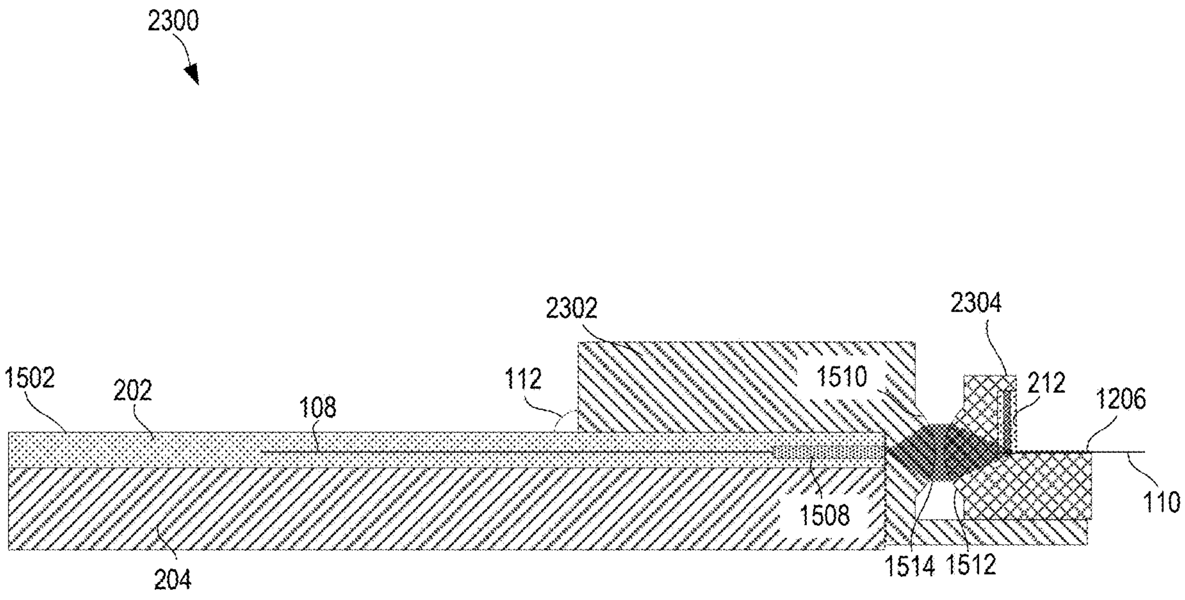
FIG. 24 is a cross-sectional view of the system of FIG. 23.
Figure 25:
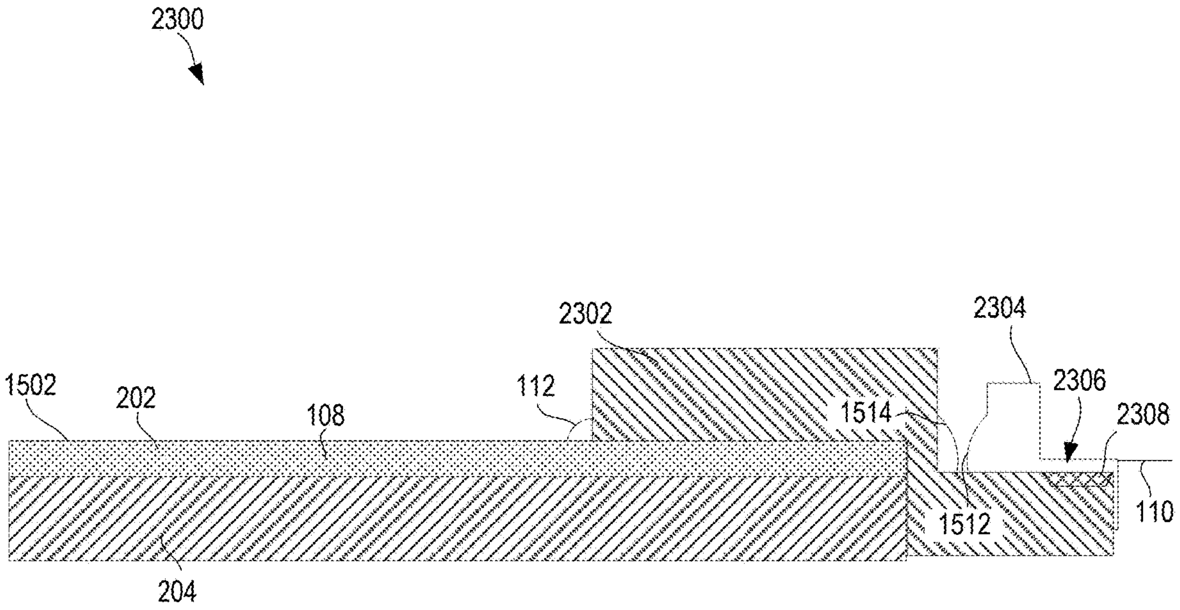
FIG. 25 is a cross-sectional view of the system of FIG. 23.
Figure 26:
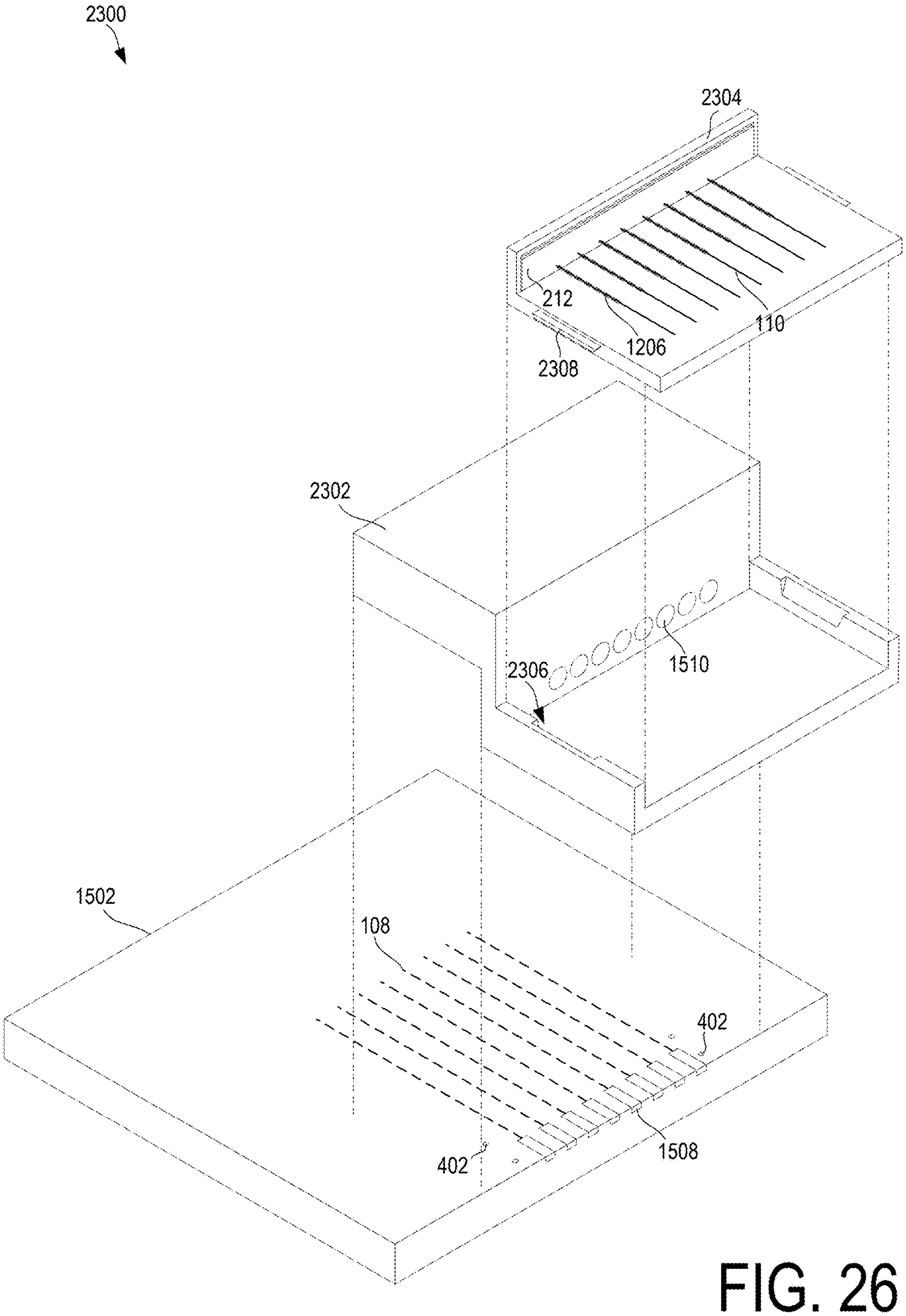
FIG. 26 is an exploded view of the system of FIG. 23.

Referring now to FIGS. 23-26, in one embodiment, a system 2300 includes a photonic integrated circuit (PIC) die 1502, an optical connector interface 2302, and an optical connector 2304. FIG. 23 shows an isometric view of the system 2300, FIG. 24 shows a cross-sectional view of the system 2300 through a lens 1510, FIG. 25 shows a cross-sectional view of the system 2300 through a cavity 2306 of the optical connector interface 2302 and a protrusion 2308 of the optical connector 2304, and FIG. 26 shows an exploded view of the system 2300.

The optical connector interface 2302 includes an array of lenses 1510 to collimate the beam 1514 coming from each waveguide 108. The optical connector 2304 includes an array of lenses 1512 to focus each beam 1514 to a corresponding fiber 110.

The optical connector interface 2302 has a V-shaped cavity 2306, and the optical connector 2304 has a V-shaped protrusion 2308 that mates with the V-shaped cavity 2306. The cavity 2306 and protrusion 2308 can passively align to the optical connector 2304 to the optical connector interface 2302.

Figure 27:
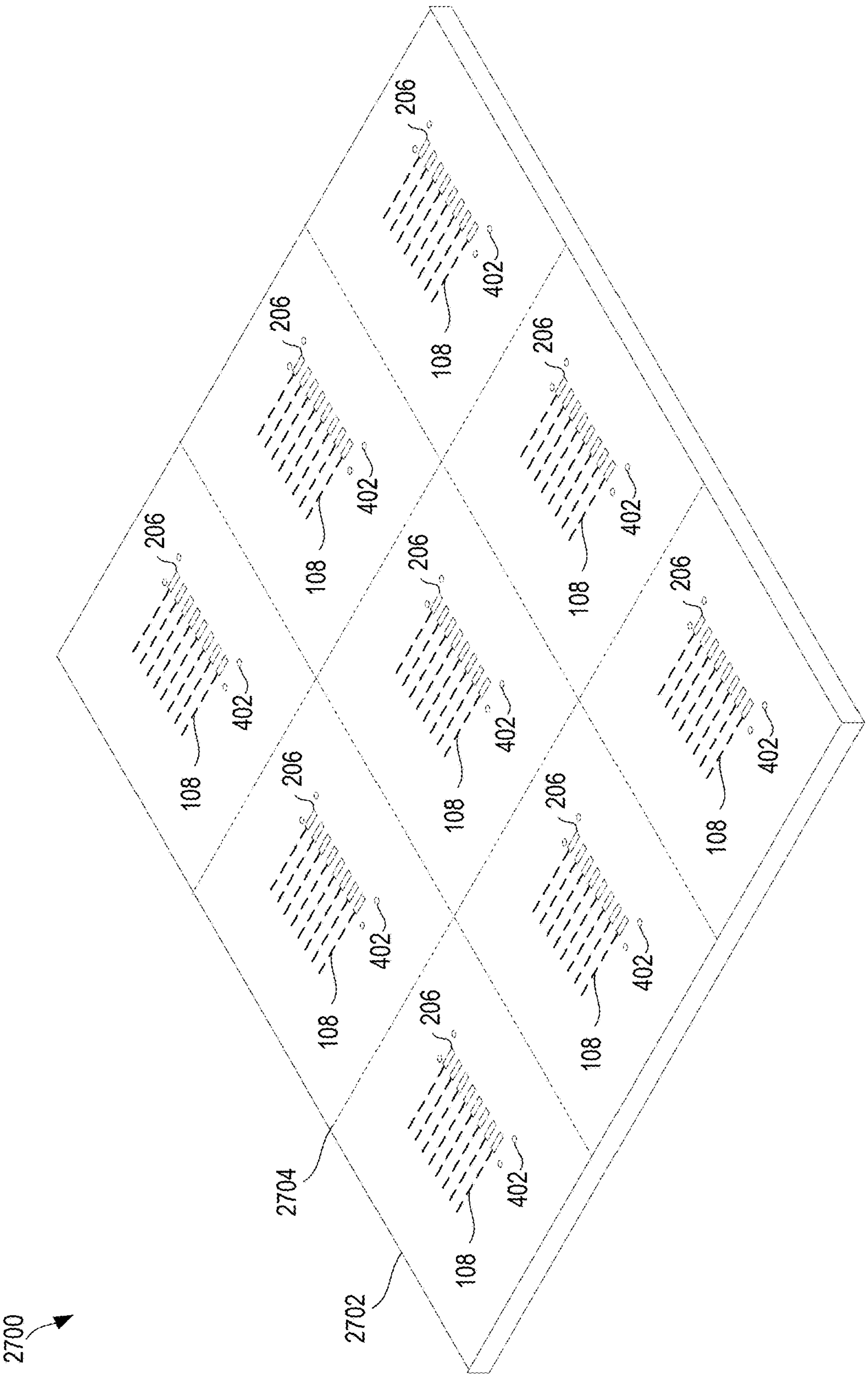
FIG. 27 is an isometric view of a system with a wafer including several photonic integrated circuits.
Figure 28:
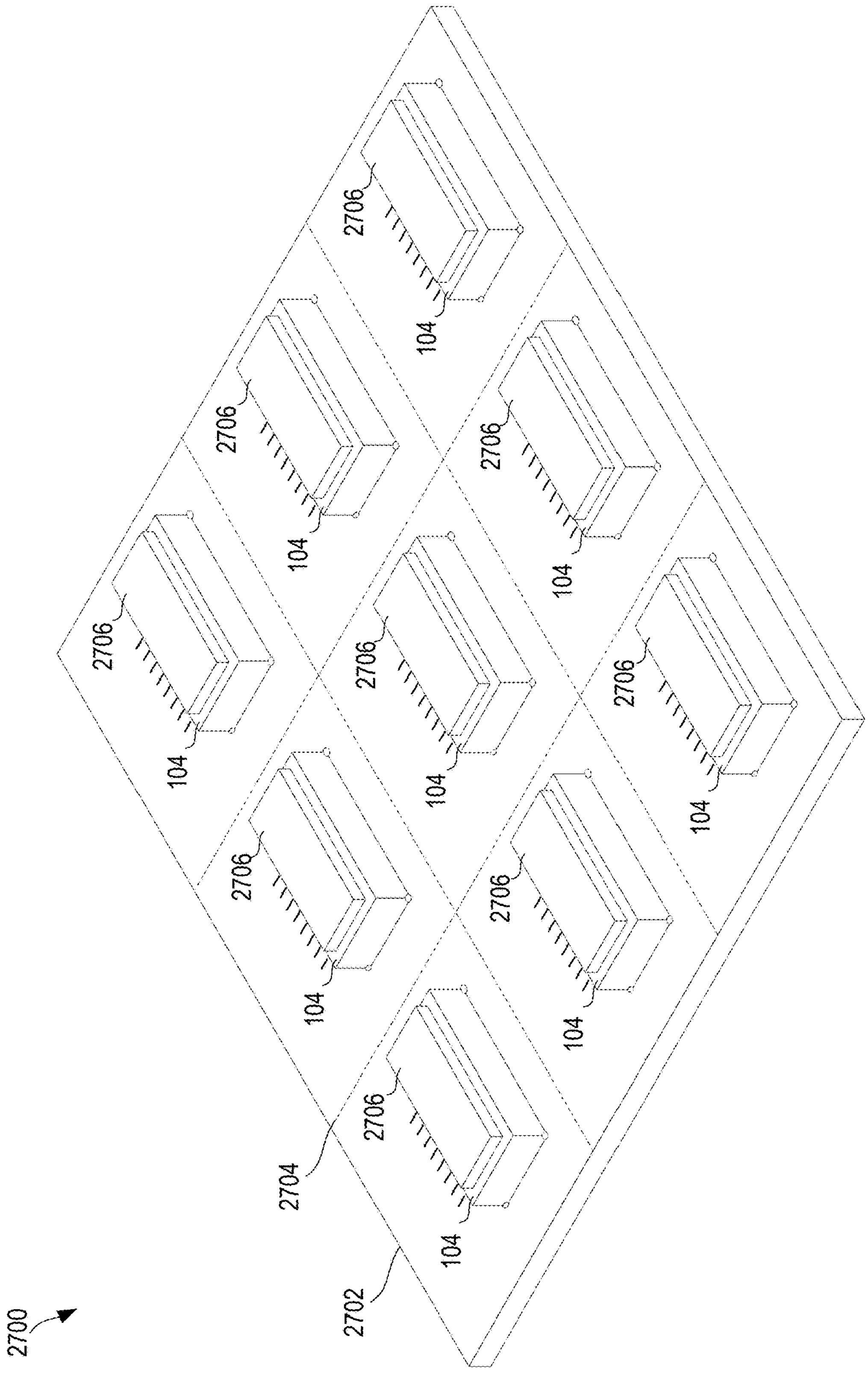
FIG. 28 is an isometric view of the system of FIG. 27 with several optical connector interfaces on the wafer.
Figure 29:
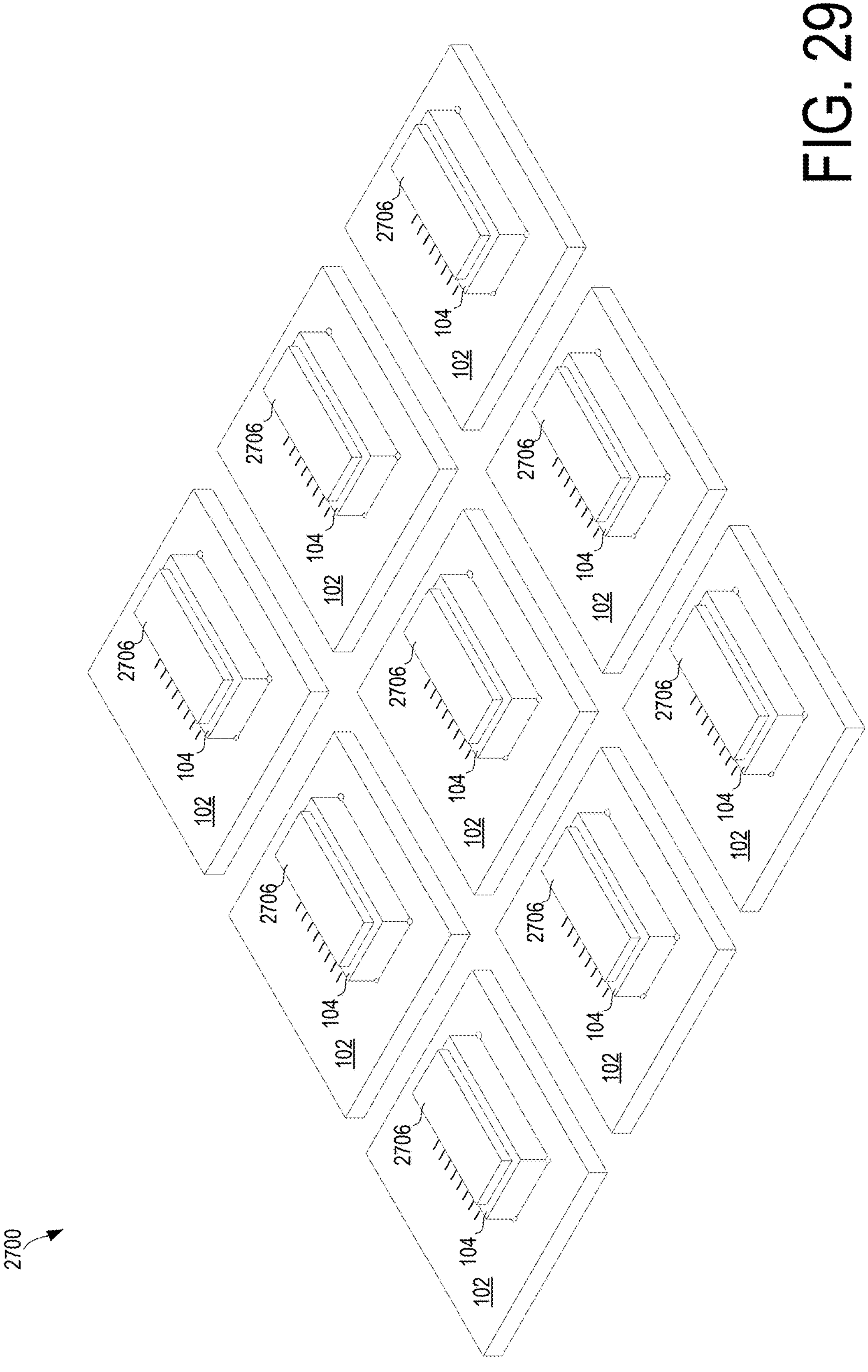
FIG. 29 is an isometric view of the system of FIG. 27 with the wafer singulated into dies.

Referring now to FIGS. 27-29, in one embodiment, a system 2700 for creating several PIC dies 102 is shown in FIG. 27. The wafer 2702 shown in FIG. 27 includes on which are several arrays of waveguides 108, vertical couplers 206, and fiducials 402. Dashed lines 2704 indicate where the wafer can be singulated at a later time. In some embodiments, the wafer 2702 includes edge couplers 1508 with a trench defined in the wafer 2702 at the end of each array of edge couplers 1508 fot placement of an optical connector interface.

Referring now to FIG. 28, in one embodiment, an optical connector interface 104 is positioned over each array of waveguides 108, such as by using a pick-and-place machine. Each optical connector interface 104 is epoxied to the wafer 2702 to be held in place. In the illustrative embodiment, a lid 2706 is placed over the cavity of the optical connector interface 104 to protect the lenses 210, optical isolator 212, or other components from dust or damage. The lid 2706 may be any suitable material, such as plastic, glass, metal, etc. In other embodiments, a lid 2706 may not be used, such as if the optical connector 106 is mated with the optical connector interface in a clean room.

Referring now to FIG. 29, in one embodiment, the wafer 2702 is singulated, resulting in several PIC dies 102 with an optical connector interface 104. The PIC dies 102 may be packaged for sale or transport, integrated with other components, or used for any other suitable purpose.

In the illustrative embodiment, the wafer 2702 is used to create PIC dies 102 with an optical connector interface 104. In other embodiment, the wafer 2702 may be used to create any other suitable PIC dies disclosed herein with any other suitable optical connector interface disclosed herein.

Figure 30:
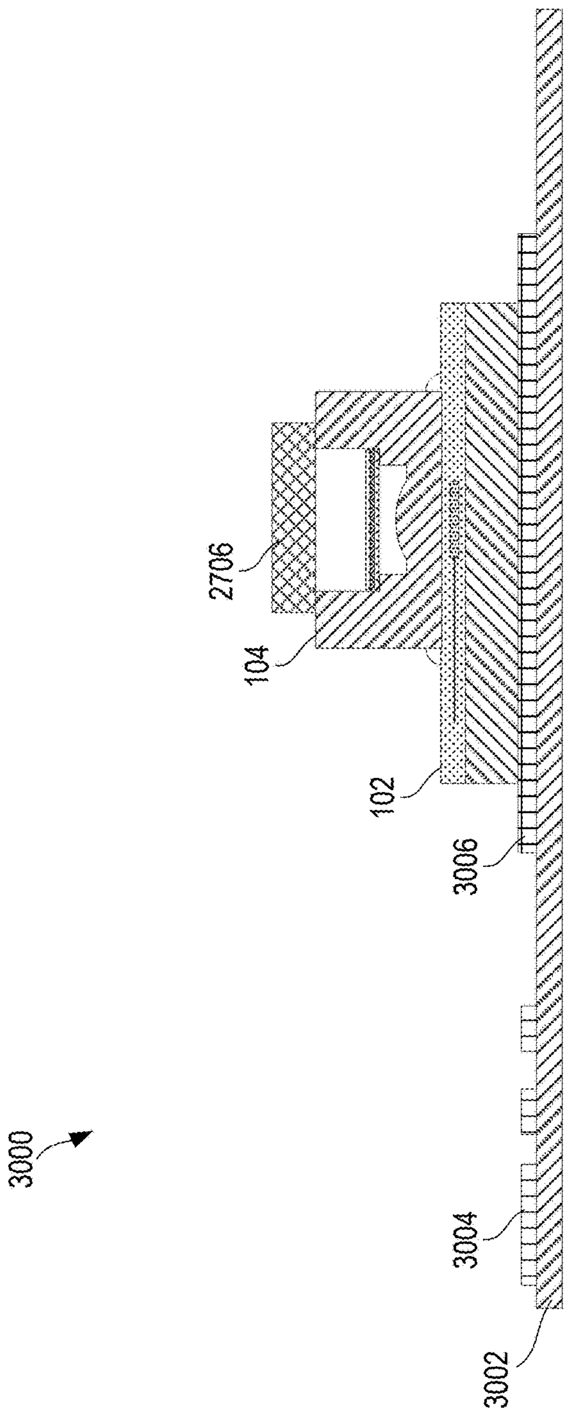
FIG. 30 is a cross-sectional view of a system including a photonic integrated circuit mated with a circuit board.
Figure 31:
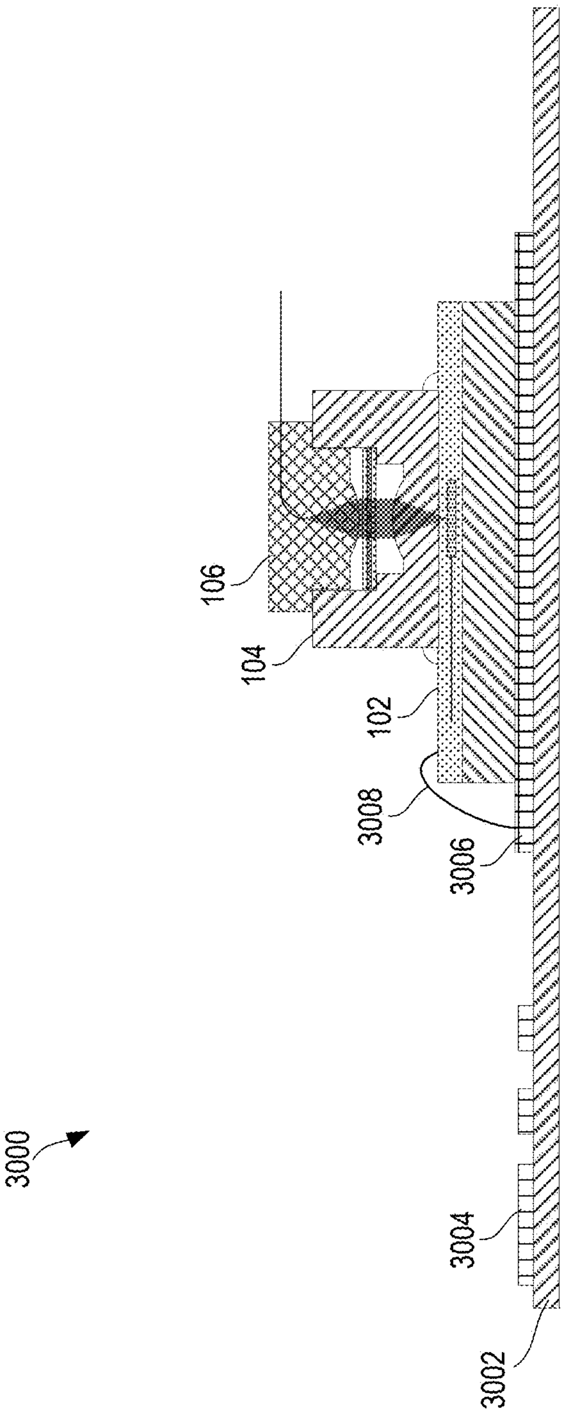
FIG. 31 is a cross-sectional view of the system of FIG. 30 with the photonic integrated circuit wire bonded to a submount on the circuit board.

Referring now to FIGS. 30 and 31, in one embodiment, a system 3000 includes a circuit board 3002, on which a PIC die 102 and/or other components such as electrical integrated circuits (EICs) 3004. In the illustrative embodiment, a submount 3006 is positioned between the circuit board 3002 and the PIC die 102. In other embodiments, a submount 3006 may not be used. As shown in FIG. 30, when the PIC die 102 is initially mounted on the board 3002, the lid 2706 may be in place to protect optical surfaces of the optical connector interface 104.

In use, the PIC die 102 may be connected to the submount 3006 and/or the board 3002 with use of one or more wire bonds 3008, which may connect to electrical pads or contacts on the PIC die 102. The optical connector 106 may be plugged into the optical connector interface 104, as shown in FIG. 31.

The illustrative circuit board 3002 may be made from ceramic, glass, and/or organic based materials with fiberglass and resin, such as FR-4. The circuit board 3002 may have any suitable length or width, such as 10-500 millimeters. The circuit board 3002 may have any suitable thickness, such as 0.2-5 millimeters. The circuit board 3002 may support additional components besides the PIC die 102, such as an integrated circuit component, a processor unit, a memory device, an accelerator device, etc. The system 3000 may be embodied as or otherwise include a system-on-a-chip, a network router, a network switch, a network interface controller, a server computer, a mobile computing device, a component on a communications satellite, etc.

Figure 32:
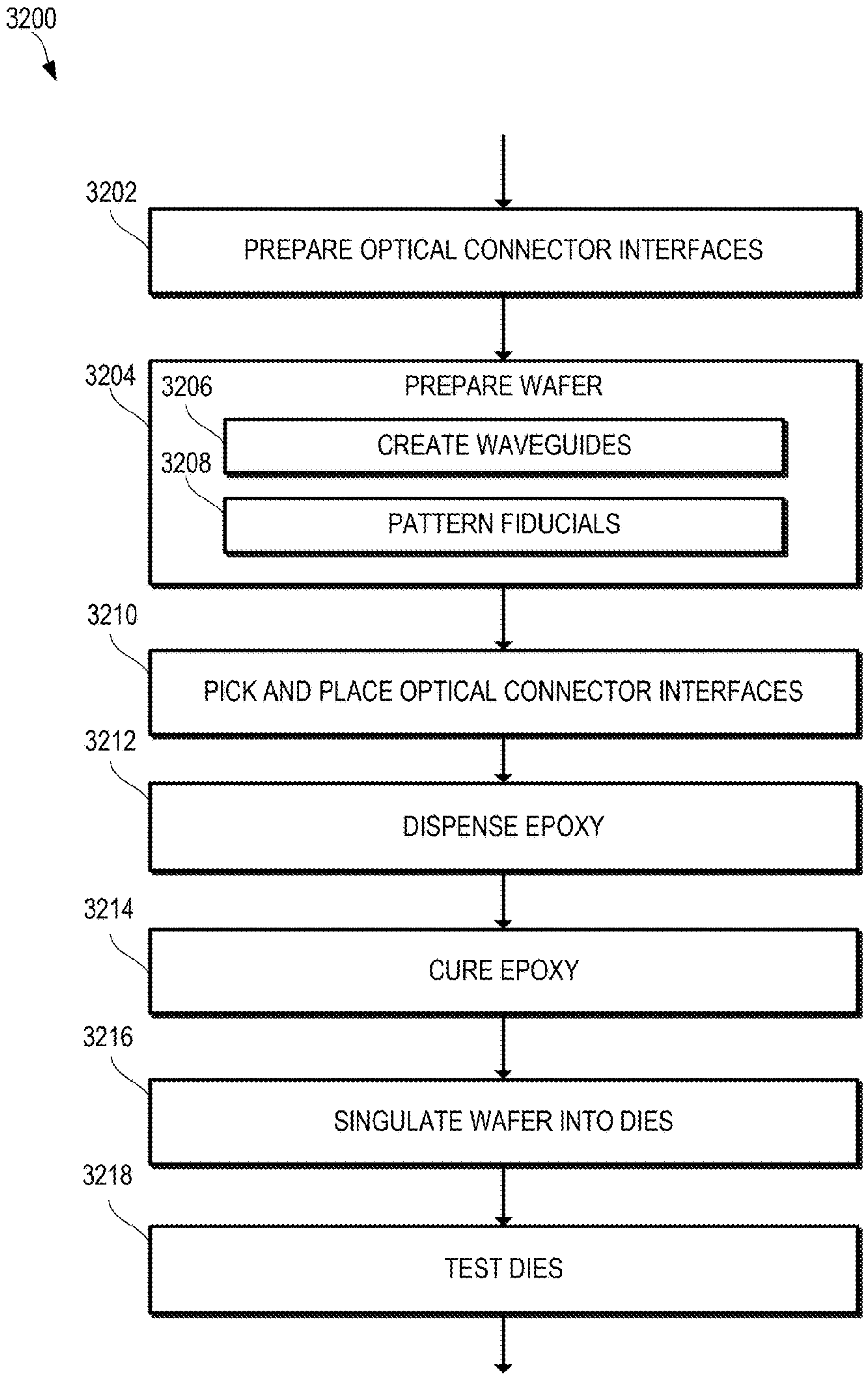
FIG. 32 is a simplified flow diagram of at least one embodiment of a method for manufacturing a photonic integrated circuit.

Referring now to FIG. 32, in one embodiment, a flowchart for a method 3200 for creating the system 100 with a PIC die 102 is shown. The method 3200 may be executed by a technician and/or by one or more automated machines. In some embodiments, one or more machines may be programmed to do some or all of the steps of the method 3200. Such a machine may include, e.g., a memory, a processor, data storage, etc. The memory and/or data storage may store instructions that, when executed by the machine, causes the machine to perform some or all of the steps of the method 3200. The method 3200 may use any suitable set of techniques that are used in semiconductor processing, such as chemical vapor deposition, atomic layer deposition, physical layer deposition, molecular beam epitaxy, layer transfer, photolithography, ion implantation, dry etching, wet etching, thermal treatments, flip chip, layer transfer, magnetron sputter deposition, pulsed laser deposition, etc. It should be appreciated that the method 3200 is merely one embodiment of a method to create the system 100, and other methods may be used to create the system 100. In some embodiments, steps of the method 3200 may be performed in a different order than that shown in the flowchart. It should be appreciated that the method 3200 may be adapted to create different systems disclosed herein, such as the system 600, 1000, 1100, 1200, 1500, etc.

The method 3200 begins in block 3202, in which one or more optical connector interface 104 are prepared. The optical connector interfaces 104 may be prepared using any suitable process, such as injection molding, using a glass wafer, etc. In the illustrative embodiment, each optical connector interface 104 is prepared separately. In some embodiments, an array of optical connector interfaces 104 may be created, one for each PIC die 102 in a wafer 2702 (see FIG. 27). In such an embodiment, all of the optical connector interfaces 104 for a wafer may be placed as one component, and the optical connector interfaces 104 can be singulated when the PIC dies 102 are singulated.

In block 3204, a wafer 2702 of photonic integrated circuits is prepared. The wafer 2702 is shown in FIG. 27. The wafer 2702 may include, e.g., lasers or other light sources, optical detectors, filters, splitters, electrical connections, etc. As part of preparing the wafer 2702, waveguides 180 are created in block 3206. Fiducials 402 may be patterned in block 3208.

In block 3210, an optical connector interface 104 is placed over each set of waveguides 108, such as by using a pick-and-place machine. The pick-and-place machine may use the fiducials 402 to precisely place the optical connector interface 104 in a desired position. In the illustrative embodiment, the optical connector interface 104 is positioned to within, e.g., 0.5-1.5 micrometers in the directions perpendicular to the propagation of light from the waveguides 108. More generally, the optical connector interface 104 may be positioned to within 0.5-20 micrometers in any direction, depending on the embodiment.

In block 3212, epoxy 112 is dispensed where the optical connector interface 104 meets the PIC die 102. The epoxy 112 may be dispensed as, e.g., drops at discrete locations and/or as a line.

In block 3214, the epoxy 112 is cured, securing the optical connector interfaces 104 in place. The epoxy 112 can be cured by exposure with ultraviolet light. Additionally or alternatively, the epoxy 112 can be cured in an oven.

In block 3216, the wafer 2702 is singulated into several PIC dies 102, as shown in FIG. 29.

In block 3218, in some embodiments, the PIC dies 102 are individually tested, such as by providing power to the PIC die 102 and testing operation of the photonic integrated circuit and/or alignment of the optical connector interface 104. PIC dies 102 that are faulty can be discarded at this stage, preventing any PIC die 102 from being incorporated into a package or other component, which would then reduce the yield of the packaging process.

The PIC dies 102 may then be placed on a circuit board, as shown in FIG. 30, integrated into a package, possibly with one or more other components, or used in any other suitable manner.

Figure 33:
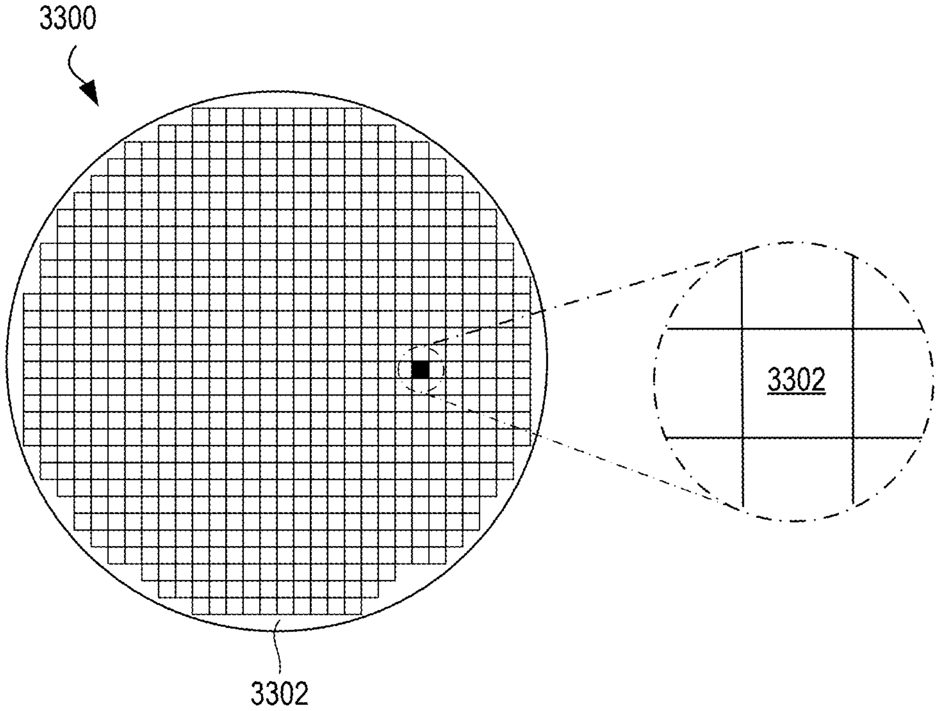
FIG. 33 is a top view of a wafer and dies that may be included in a microelectronic assembly, in accordance with any of the embodiments disclosed herein.

FIG. 33 is a top view of a wafer 3300 and dies 3302 that may be included in any of the systems 100 disclosed herein (e.g., as any suitable ones of the PIC dies 102). The wafer 3300 may be composed of semiconductor material and may include one or more dies 3302 having integrated circuit structures formed on a surface of the wafer 3300. The individual dies 3302 may be a repeating unit of an integrated circuit product that includes any suitable integrated circuit. After the fabrication of the semiconductor product is complete, the wafer 3300 may undergo a singulation process in which the dies 3302 are separated from one another to provide discrete "chips" of the integrated circuit product. The die 3302 may be any of the PIC dies 102 disclosed herein. The die 3302 may include one or more transistors (e.g., some of the transistors 3440 of FIG. 34, discussed below), supporting circuitry to route electrical signals to the transistors, passive components (e.g., signal traces, resistors, capacitors, or inductors), and/or any other integrated circuit components. In some embodiments, the wafer 3300 or the die 3302 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 3302. For example, a memory array formed by multiple memory devices may be formed on a same die 3302 as a processor unit (e.g., the processor unit 3702 of FIG. 37) or other logic that is configured to store information in the memory devices or execute instructions stored in the memory array. Various ones of the systems 100, 600, etc. disclosed herein may be manufactured using a die-to-wafer assembly technique in which some PIC dies 102 are attached to a wafer 3300 that include others of the PIC dies 102, and the wafer 3300 is subsequently singulated.

Figure 34:
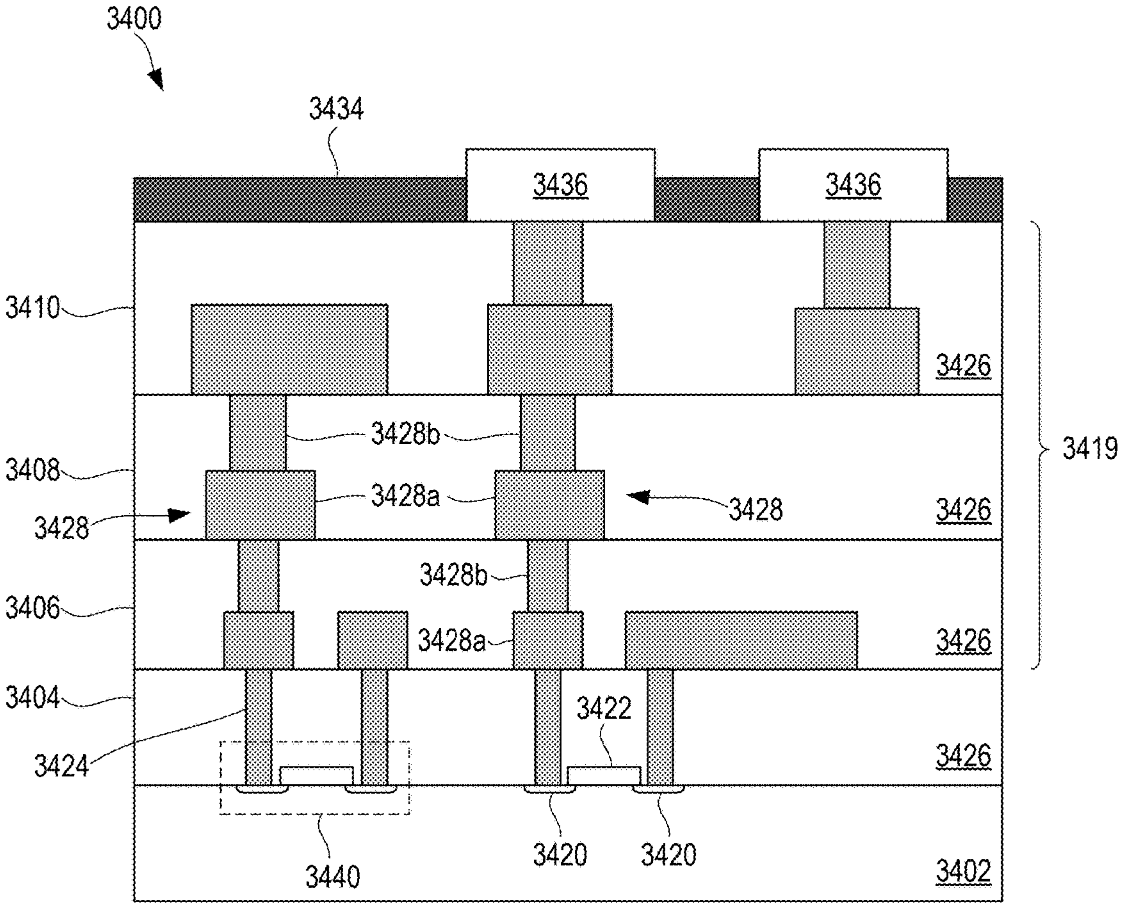
FIG. 34 is a cross-sectional side view of an integrated circuit device that may be included in a microelectronic assembly, in accordance with any of the embodiments disclosed herein.

FIG. 34 is a cross-sectional side view of an integrated circuit device 3400 that may be included in any of the systems disclosed herein (e.g., in any of the PIC dies 102). One or more of the integrated circuit devices 3400 may be included in one or more dies 3302 (FIG. 33). The integrated circuit device 3400 may be formed on a die substrate 3402 (e.g., the wafer 3300 of FIG. 33) and may be included in a die (e.g., the die 3302 of FIG. 33). The die substrate 3402 may be a semiconductor substrate composed of semiconductor material systems including, for example, n-type or p-type materials systems (or a combination of both). The die substrate 3402 may include, for example, a crystalline substrate formed using a bulk silicon or a silicon-on-insulator (SOI) substructure. In some embodiments, the die substrate 3402 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 3402. Although a few examples of materials from which the die substrate 3402 may be formed are described here, any material that may serve as a foundation for an integrated circuit device 3400 may be used. The die substrate 3402 may be part of a singulated die (e.g., the dies 3302 of FIG. 33) or a wafer (e.g., the wafer 3300 of FIG. 33).

The integrated circuit device 3400 may include one or more device layers 3404 disposed on the die substrate 3402. The device layer 3404 may include features of one or more transistors 3440 (e.g., metal oxide semiconductor field-effect transistors (MOSFETs)) formed on the die substrate 3402. The transistors 3440 may include, for example, one or more source and/or drain (S/D) regions 3420, a gate 3422 to control current flow between the S/D regions 3420, and one or more S/D contacts 3424 to route electrical signals to/from the S/D regions 3420. The transistors 3440 may include additional features not depicted for the sake of clarity, such as device isolation regions, gate contacts, and the like. The transistors 3440 are not limited to the type and configuration depicted in FIG. 34 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

FIGS. 35A-35D are simplified perspective views of example planar, FinFET, gate-all-around, and stacked gate-all-around transistors. The transistors illustrated in FIGS. 35A-35D are formed on a substrate 3516 having a surface 3508. Isolation regions 3514 separate the source and drain regions of the transistors from other transistors and from a bulk region 3518 of the substrate 3516.

Figure 35A:
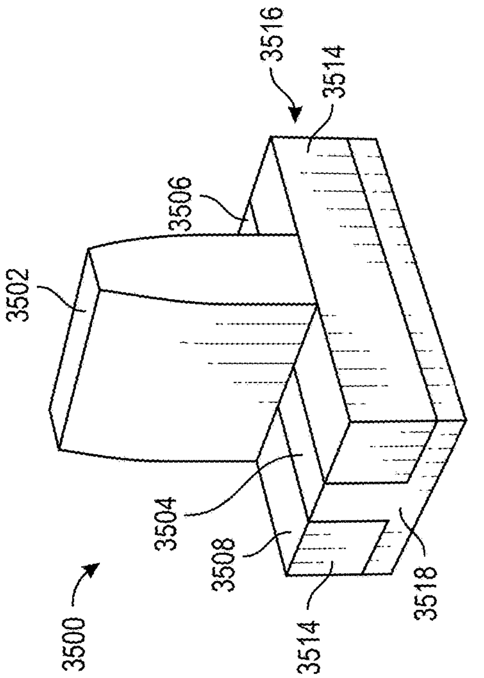
FIGS. 35A-35D are perspective views of example planar, gate-all-around, and stacked gate-all-around transistors.

FIG. 35A is a perspective view of an example planar transistor 3500 comprising a gate 3502 that controls current flow between a source region 3504 and a drain region 3506. The transistor 3500 is planar in that the source region 3504 and the drain region 3506 are planar with respect to the substrate surface 3508.

Figure 35B:
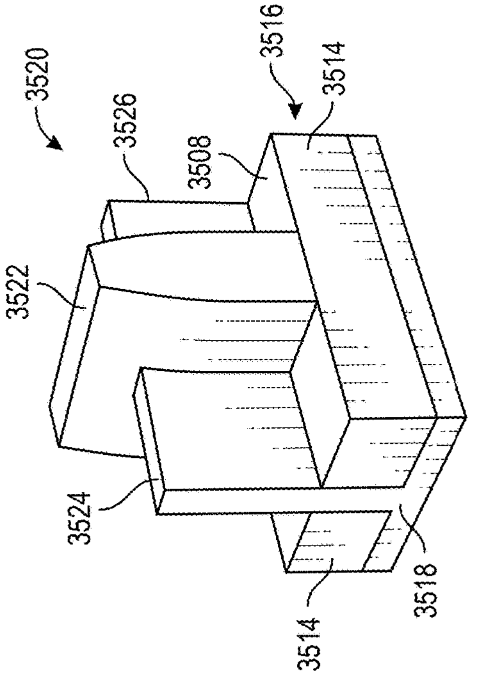

FIG. 35B is a perspective view of an example FinFET transistor 3520 comprising a gate 3522 that controls current flow between a source region 3524 and a drain region 3526. The transistor 3520 is non-planar in that the source region 3524 and the drain region 3526 comprise "fins" that extend upwards from the substrate surface 3528. As the gate 3522 encompasses three sides of the semiconductor fin that extends from the source region 3524 to the drain region 3526, the transistor 3520 can be considered a tri-gate transistor. FIG. 35B illustrates one S/D fin extending through the gate 3522, but multiple S/D fins can extend through the gate of a FinFET transistor.

Figure 35C:
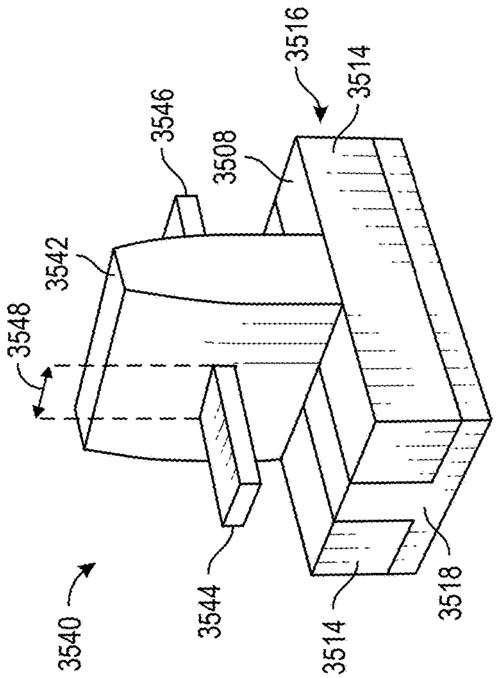

FIG. 35C is a perspective view of a gate-all-around (GAA) transistor 3540 comprising a gate 3542 that controls current flow between a source region 3544 and a drain region 3546. The transistor 3540 is non-planar in that the source region 3544 and the drain region 3546 are elevated from the substrate surface 3528.

Figure 35D:
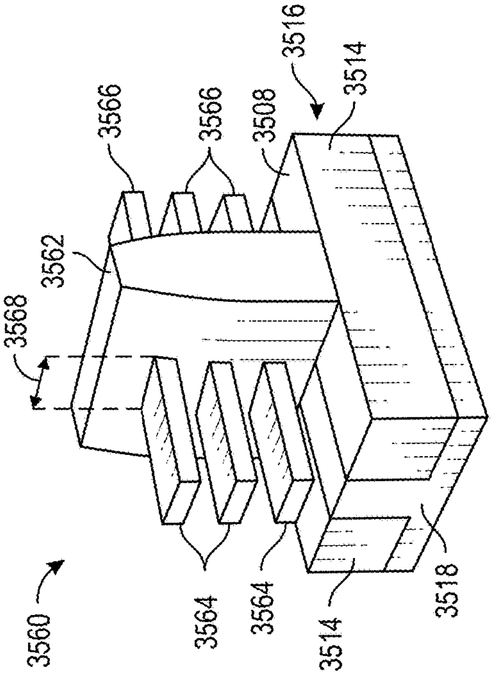

FIG. 35D is a perspective view of a GAA transistor 3560 comprising a gate 3562 that controls current flow between multiple elevated source regions 3564 and multiple elevated drain regions 3566. The transistor 3560 is a stacked GAA transistor as the gate controls the flow of current between multiple elevated S/D regions stacked on top of each other. The transistors 3540 and 3560 are considered gate-all-around transistors as the gates encompass all sides of the semiconductor portions that extends from the source regions to the drain regions. The transistors 3540 and 3560 can alternatively be referred to as nanowire, nanosheet, or nanoribbon transistors depending on the width (e.g., widths 3548 and 3568 of transistors 3540 and 3560, respectively) of the semiconductor portions extending through the gate.

Returning to FIG. 34, a transistor 3440 may include a gate 3422 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 3440 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 3440 along the source-channel-drain direction, the gate electrode may consist of a U-shaped structure that includes a bottom portion substantially parallel to the surface of the die substrate 3402 and two sidewall portions that are substantially perpendicular to the top surface of the die substrate 3402. In other embodiments, at least one of the metal layers that form the gate electrode may simply be a planar layer that is substantially parallel to the top surface of the die substrate 3402 and does not include sidewall portions substantially perpendicular to the top surface of the die substrate 3402. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 3420 may be formed within the die substrate 3402 adjacent to the gate 3422 of individual transistors 3440. The S/D regions 3420 may be formed using an implantation/diffusion process or an etching/deposition process, for example. In the former process, dopants such as boron, aluminum, antimony, phosphorous, or arsenic may be ion-implanted into the die substrate 3402 to form the S/D regions 3420. An annealing process that activates the dopants and causes them to diffuse farther into the die substrate 3402 may follow the ion-implantation process. In the latter process, the die substrate 3402 may first be etched to form recesses at the locations of the S/D regions 3420. An epitaxial deposition process may then be carried out to fill the recesses with material that is used to fabricate the S/D regions 3420. In some implementations, the S/D regions 3420 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 3420 may be formed using one or more alternate semiconductor materials such as germanium or a group III-V material or alloy. In further embodiments, one or more layers of metal and/or metal alloys may be used to form the S/D regions 3420.

Electrical signals, such as power and/or input/output (I/O) signals, may be routed to and/or from the devices (e.g., transistors 3440) of the device layer 3404 through one or more interconnect layers disposed on the device layer 3404 (illustrated in FIG. 34 as interconnect layers 3406-3410). For example, electrically conductive features of the device layer 3404 (e.g., the gate 3422 and the S/D contacts 3424) may be electrically coupled with the interconnect structures 3428 of the interconnect layers 3406-3410. The one or more interconnect layers 3406-3410 may form a metallization stack (also referred to as an "ILD stack") 3419 of the integrated circuit device 3400.

The interconnect structures 3428 may be arranged within the interconnect layers 3406-3410 to route electrical signals according to a wide variety of designs; in particular, the arrangement is not limited to the particular configuration of interconnect structures 3428 depicted in FIG. 34. Although a particular number of interconnect layers 3406-3410 is depicted in FIG. 34, embodiments of the present disclosure include integrated circuit devices having more or fewer interconnect layers than depicted.

In some embodiments, the interconnect structures 3428 may include lines **3428*a* and/or vias 3428*b* filled with an electrically conductive material such as a metal. The lines 3428*a* may be arranged to route electrical signals in a direction of a plane that is substantially parallel with a surface of the die substrate 3402 upon which the device layer 3404 is formed. The vias 3428*b* may be arranged to route electrical signals in a direction of a plane that is substantially perpendicular to the surface of the die substrate 3402 upon which the device layer 3404 is formed. In some embodiments, the vias 3428*b* may electrically couple lines 3428*a* of different interconnect layers 3406-3410** together.

The interconnect layers 3406-3410 may include a dielectric material 3426 disposed between the interconnect structures 3428, as shown in FIG. 34. In some embodiments, dielectric material 3426 disposed between the interconnect structures 3428 in different ones of the interconnect layers 3406-3410 may have different compositions; in other embodiments, the composition of the dielectric material 3426 between different interconnect layers 3406-3410 may be the same. The device layer 3404 may include a dielectric material 3426 disposed between the transistors 3440 and a bottom layer of the metallization stack as well. The dielectric material 3426 included in the device layer 3404 may have a different composition than the dielectric material 3426 included in the interconnect layers 3406-3410; in other embodiments, the composition of the dielectric material 3426 in the device layer 3404 may be the same as a dielectric material 3426 included in any one of the interconnect layers 3406-3410.

A first interconnect layer 3406 (referred to as Metal 1 or "M1") may be formed directly on the device layer 3404. In some embodiments, the first interconnect layer 3406 may include lines 3428*a* and/or vias 3428*b*, as shown. The lines 3428*a* of the first interconnect layer 3406 may be coupled with contacts (e.g., the S/D contacts 3424) of the device layer 3404. The vias 3428*b* of the first interconnect layer 3406 may be coupled with the lines 3428*a* of a second interconnect layer 3408.

The second interconnect layer 3408 (referred to as Metal 2 or "M2") may be formed directly on the first interconnect layer 3406. In some embodiments, the second interconnect layer 3408 may include via 3428*b* to couple the lines 3428 of the second interconnect layer 3408 with the lines 3428*a* of a third interconnect layer 3410. Although the lines 3428*a* and the vias 3428*b* are structurally delineated with a line within individual interconnect layers for the sake of clarity, the lines 3428*a* and the vias 3428*b* may be structurally and/or materially contiguous (e.g., simultaneously filled during a dual-damascene process) in some embodiments.

The third interconnect layer 3410 (referred to as Metal 3 or "M3") (and additional interconnect layers, as desired) may be formed in succession on the second interconnect layer 3408 according to similar techniques and configurations described in connection with the second interconnect layer 3408 or the first interconnect layer 3406. In some embodiments, the interconnect layers that are "higher up" in the metallization stack 3419 in the integrated circuit device 3400 (i.e., farther away from the device layer 3404) may be thicker that the interconnect layers that are lower in the metallization stack 3419, with lines 3428*a* and vias 3428*b* in the higher interconnect layers being thicker than those in the lower interconnect layers.

The integrated circuit device 3400 may include a solder resist material 3434 (e.g., polyimide or similar material) and one or more conductive contacts 3436 formed on the interconnect layers 3406-3410. In FIG. 34, the conductive contacts 3436 are illustrated as taking the form of bond pads. The conductive contacts 3436 may be electrically coupled with the interconnect structures 3428 and configured to route the electrical signals of the transistor(s) 3440 to external devices. For example, solder bonds may be formed on the one or more conductive contacts 3436 to mechanically and/or electrically couple an integrated circuit die including the integrated circuit device 3400 with another component (e.g., a printed circuit board). The integrated circuit device 3400 may include additional or alternate structures to route the electrical signals from the interconnect layers 3406-3410; for example, the conductive contacts 3436 may include other analogous features (e.g., posts) that route the electrical signals to external components.

In some embodiments in which the integrated circuit device 3400 is a double-sided die, the integrated circuit device 3400 may include another metallization stack (not shown) on the opposite side of the device layer(s) 3404. This metallization stack may include multiple interconnect layers as discussed above with reference to the interconnect layers 3406-3410, to provide conductive pathways (e.g., including conductive lines and vias) between the device layer(s) 3404 and additional conductive contacts (not shown) on the opposite side of the integrated circuit device 3400 from the conductive contacts 3436.

In other embodiments in which the integrated circuit device 3400 is a double-sided die, the integrated circuit device 3400 may include one or more through silicon vias (TSVs) through the die substrate 3402; these TSVs may make contact with the device layer(s) 3404, and may provide conductive pathways between the device layer(s) 3404 and additional conductive contacts (not shown) on the opposite side of the integrated circuit device 3400 from the conductive contacts 3436. In some embodiments, TSVs extending through the substrate can be used for routing power and ground signals from conductive contacts on the opposite side of the integrated circuit device 3400 from the conductive contacts 3436 to the transistors 3440 and any other components integrated into the die 3400, and the metallization stack 3419 can be used to route I/O signals from the conductive contacts 3436 to transistors 3440 and any other components integrated into the die 3400.

Multiple integrated circuit devices 3400 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 36:
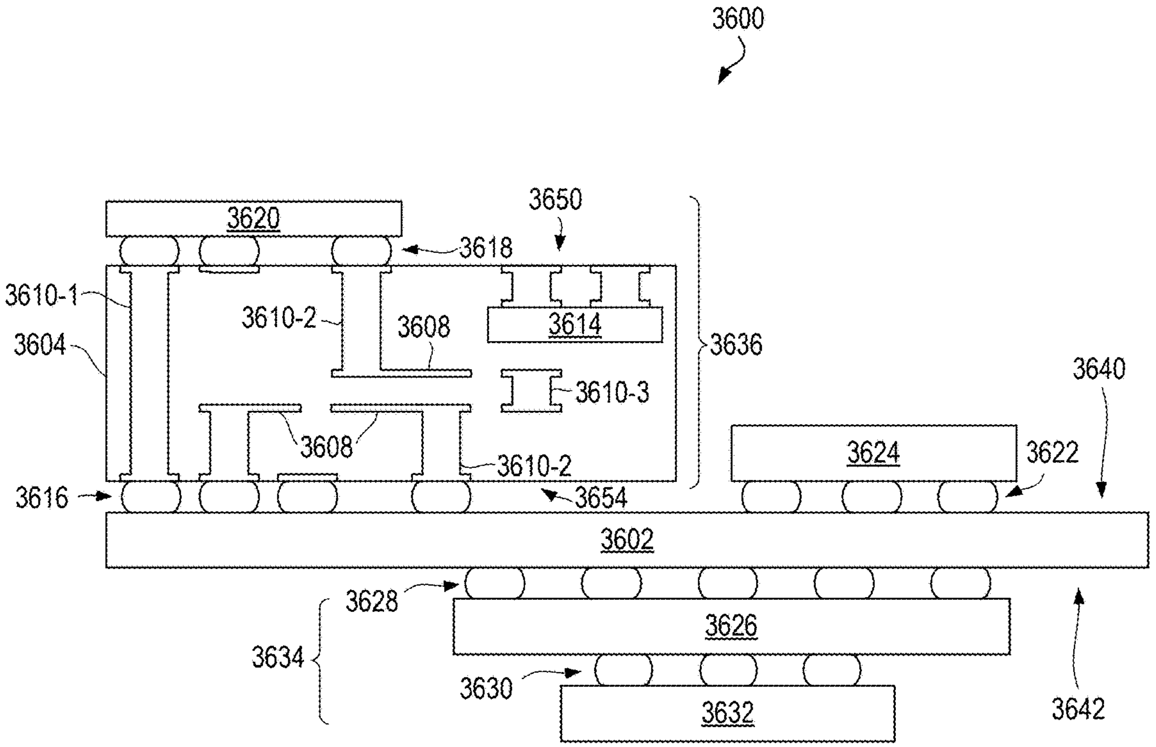
FIG. 36 is a cross-sectional side view of an integrated circuit device assembly that may include a microelectronic assembly, in accordance with any of the embodiments disclosed herein.

FIG. 36 is a cross-sectional side view of an integrated circuit device assembly 3600. The integrated circuit device assembly 3600 includes a number of components disposed on a circuit board 3602 (which may be a motherboard, system board, mainboard, etc.). The integrated circuit device assembly 3600 includes components disposed on a first face 3640 of the circuit board 3602 and an opposing second face 3642 of the circuit board 3602; generally, components may be disposed on one or both faces 3640 and 3642. Any of the integrated circuit components discussed below with reference to the integrated circuit device assembly 3600 may take the form of any suitable ones of the embodiments of the systems disclosed herein.

In some embodiments, the circuit board 3602 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 3602. In other embodiments, the circuit board 3602 may be a non-PCB substrate. In some embodiments the circuit board 3602 may be, for example, the circuit board 2602. The integrated circuit device assembly 3600 illustrated in FIG. 36 includes a package-on-interposer structure 3636 coupled to the first face 3640 of the circuit board 3602 by coupling components 3616. The coupling components 3616 may electrically and mechanically couple the package-on-interposer structure 3636 to the circuit board 3602, and may include solder balls (as shown in FIG. 36), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 3636 may include an integrated circuit component 3620 coupled to an interposer 3604 by coupling components 3618. The coupling components 3618 may take any suitable form for the application, such as the forms discussed above with reference to the coupling components 3616. Although a single integrated circuit component 3620 is shown in FIG. 36, multiple integrated circuit components may be coupled to the interposer 3604; indeed, additional interposers may be coupled to the interposer 3604. The interposer 3604 may provide an intervening substrate used to bridge the circuit board 3602 and the integrated circuit component 3620.

The integrated circuit component 3620 may be a packaged or unpacked integrated circuit product that includes one or more integrated circuit dies (e.g., the die 3302 of FIG. 33, the integrated circuit device 3400 of FIG. 34) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 3620, a single monolithic integrated circuit die comprises solder bumps attached to contacts on the die. The solder bumps allow the die to be directly attached to the interposer 3604. The integrated circuit component 3620 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 3620 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 3620 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 3620 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 3604 may spread connections to a wider pitch or reroute a connection to a different connection. For example, the interposer 3604 may couple the integrated circuit component 3620 to a set of ball grid array (BGA) conductive contacts of the coupling components 3616 for coupling to the circuit board 3602. In the embodiment illustrated in FIG. 36, the integrated circuit component 3620 and the circuit board 3602 are attached to opposing sides of the interposer 3604; in other embodiments, the integrated circuit component 3620 and the circuit board 3602 may be attached to a same side of the interposer 3604. In some embodiments, three or more components may be interconnected by way of the interposer 3604.

In some embodiments, the interposer 3604 may be formed as a PCB, including multiple metal layers separated from one another by layers of dielectric material and interconnected by electrically conductive vias. In some embodiments, the interposer 3604 may be formed of an epoxy resin, a fiberglass-reinforced epoxy resin, an epoxy resin with inorganic fillers, a ceramic material, or a polymer material such as polyimide. In some embodiments, the interposer 3604 may be formed of alternate rigid or flexible materials that may include the same materials described above for use in a semiconductor substrate, such as silicon, germanium, and other group III-V and group IV materials. The interposer 3604 may include metal interconnects 3608 and vias 3610, including but not limited to through hole vias 3610-1 (that extend from a first face 3650 of the interposer 3604 to a second face 3654 of the interposer 3604), blind vias 3610-2 (that extend from the first or second faces 3650 or 3654 of the interposer 3604 to an internal metal layer), and buried vias 3610-3 (that connect internal metal layers).

In some embodiments, the interposer 3604 can comprise a silicon interposer. Through silicon vias (TSV) extending through the silicon interposer can connect connections on a first face of a silicon interposer to an opposing second face of the silicon interposer. In some embodiments, an interposer 3604 comprising a silicon interposer can further comprise one or more routing layers to route connections on a first face of the interposer 3604 to an opposing second face of the interposer 3604.

The interposer 3604 may further include embedded devices 3614, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 3604. The package-on-interposer structure 3636 may take the form of any of the package-on-interposer structures known in the art.

The integrated circuit device assembly 3600 may include an integrated circuit component 3624 coupled to the first face 3640 of the circuit board 3602 by coupling components 3622. The coupling components 3622 may take the form of any of the embodiments discussed above with reference to the coupling components 3616, and the integrated circuit component 3624 may take the form of any of the embodiments discussed above with reference to the integrated circuit component 3620.

The integrated circuit device assembly 3600 illustrated in FIG. 36 includes a package-on-package structure 3634 coupled to the second face 3642 of the circuit board 3602 by coupling components 3628. The package-on-package structure 3634 may include an integrated circuit component 3626 and an integrated circuit component 3632 coupled together by coupling components 3630 such that the integrated circuit component 3626 is disposed between the circuit board 3602 and the integrated circuit component 3632. The coupling components 3628 and 3630 may take the form of any of the embodiments of the coupling components 3616 discussed above, and the integrated circuit components 3626 and 3632 may take the form of any of the embodiments of the integrated circuit component 3620 discussed above. The package-on-package structure 3634 may be configured in accordance with any of the package-on-package structures known in the art.

Figure 37:
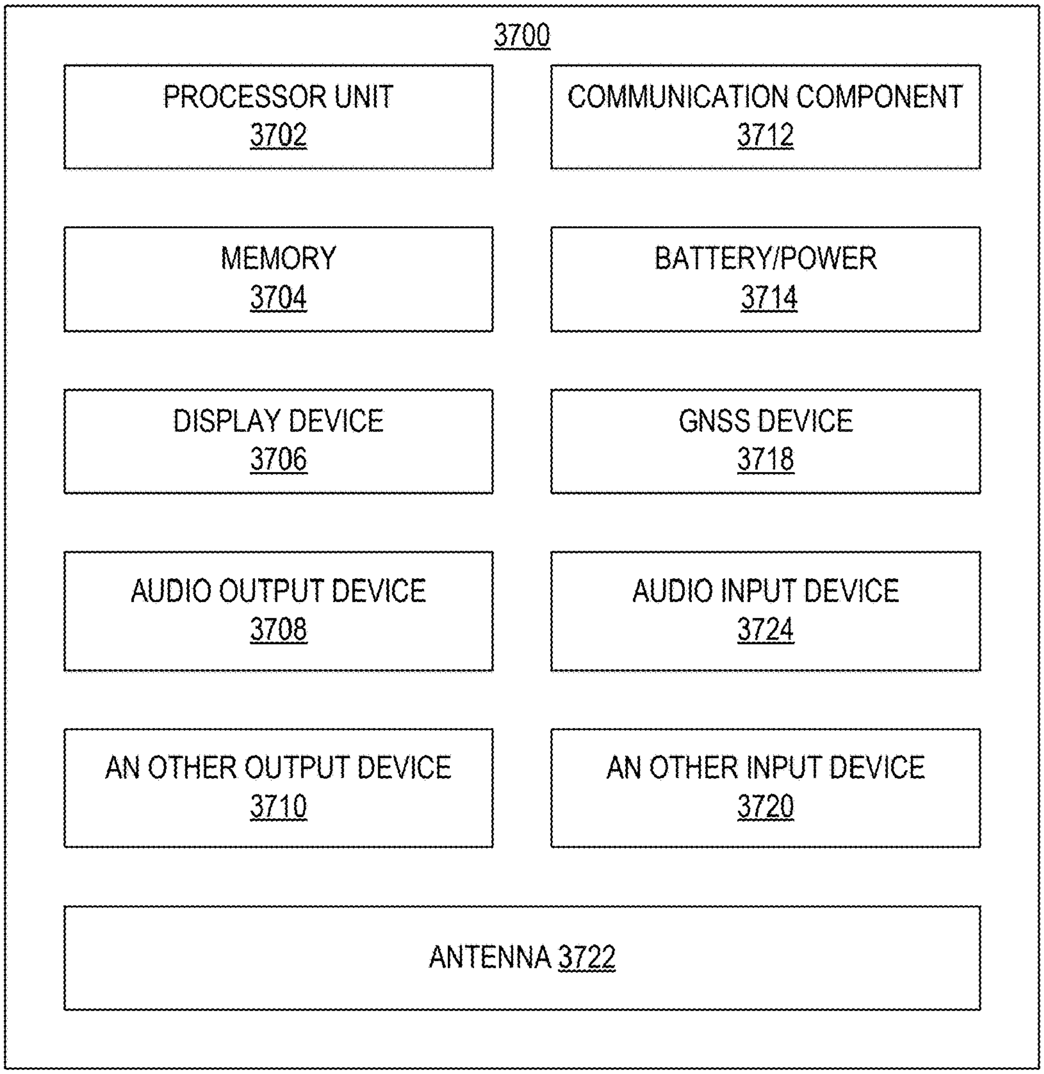
FIG. 37 is a block diagram of an example electrical device that may include a microelectronic assembly, in accordance with any of the embodiments disclosed herein.

FIG. 37 is a block diagram of an example electrical device 3700 that may include one or more of the systems 100, 600, etc. disclosed herein. For example, any suitable ones of the components of the electrical device 3700 may include one or more of the integrated circuit device assemblies 3600, integrated circuit components 3620, integrated circuit devices 3400, or integrated circuit dies 3302 disclosed herein, and may be arranged in any of the systems 100, 600, etc. disclosed herein. A number of components are illustrated in FIG. 37 as included in the electrical device 3700, but any one or more of these components may be omitted or duplicated, as suitable for the application. In some embodiments, some or all of the components included in the electrical device 3700 may be attached to one or more motherboards mainboards, or system boards. In some embodiments, one or more of these components are fabricated onto a single system-on-a-chip (SoC) die.

Additionally, in various embodiments, the electrical device 3700 may not include one or more of the components illustrated in FIG. 37, but the electrical device 3700 may include interface circuitry for coupling to the one or more components. For example, the electrical device 3700 may not include a display device 3706, but may include display device interface circuitry (e.g., a connector and driver circuitry) to which a display device 3706 may be coupled. In another set of examples, the electrical device 3700 may not include an audio input device 3724 or an audio output device 3708, but may include audio input or output device interface circuitry (e.g., connectors and supporting circuitry) to which an audio input device 3724 or audio output device 3708 may be coupled.

The electrical device 3700 may include one or more processor units 3702 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 3702 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 3700 may include a memory 3704, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 3704 may include memory that is located on the same integrated circuit die as the processor unit 3702. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 3700 can comprise one or more processor units 3702 that are heterogeneous or asymmetric to another processor unit 3702 in the electrical device 3700. There can be a variety of differences between the processing units 3702 in a system in terms of a spectrum of metrics of merit including architectural, microarchitectural, thermal, power consumption characteristics, and the like. These differences can effectively manifest themselves as asymmetry and heterogeneity among the processor units 3702 in the electrical device 3700.

In some embodiments, the electrical device 3700 may include a communication component 3712 (e.g., one or more communication components). For example, the communication component 3712 can manage wireless communications for the transfer of data to and from the electrical device 3700. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 3712 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 3712 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 3712 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 3712 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 3712 may operate in accordance with other wireless protocols in other embodiments. The electrical device 3700 may include an antenna 3722 to facilitate wireless communications and/or to receive other wireless communications (such as AM or FM radio transmissions).

In some embodiments, the communication component 3712 may manage wired communications, such as electrical, optical, or any other suitable communication protocols (e.g., IEEE 802.3 Ethernet standards). As noted above, the communication component 3712 may include multiple communication components. For instance, a first communication component 3712 may be dedicated to shorter-range wireless communications such as Wi-Fi or Bluetooth, and a second communication component 3712 may be dedicated to longer-range wireless communications such as global positioning system (GPS), EDGE, GPRS, CDMA, WiMAX, LTE, EV-DO, or others. In some embodiments, a first communication component 3712 may be dedicated to wireless communications, and a second communication component 3712 may be dedicated to wired communications.

The electrical device 3700 may include battery/power circuitry 3714. The battery/power circuitry 3714 may include one or more energy storage devices (e.g., batteries or capacitors) and/or circuitry for coupling components of the electrical device 3700 to an energy source separate from the electrical device 3700 (e.g., AC line power).

The electrical device 3700 may include a display device 3706 (or corresponding interface circuitry, as discussed above). The display device 3706 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 3700 may include an audio output device 3708 (or corresponding interface circuitry, as discussed above). The audio output device 3708 may include any embedded or wired or wirelessly connected external device that generates an audible indicator, such speakers, headsets, or earbuds.

The electrical device 3700 may include an audio input device 3724 (or corresponding interface circuitry, as discussed above). The audio input device 3724 may include any embedded or wired or wirelessly connected device that generates a signal representative of a sound, such as microphones, microphone arrays, or digital instruments (e.g., instruments having a musical instrument digital interface (MIDI) output). The electrical device 3700 may include a Global Navigation Satellite System (GNSS) device 3718 (or corresponding interface circuitry, as discussed above), such as a Global Positioning System (GPS) device. The GNSS device 3718 may be in communication with a satellite-based system and may determine a geolocation of the electrical device 3700 based on information received from one or more GNSS satellites, as known in the art.

The electrical device 3700 may include an other output device 3710 (or corresponding interface circuitry, as discussed above). Examples of the other output device 3710 may include an audio codec, a video codec, a printer, a wired or wireless transmitter for providing information to other devices, or an additional storage device.

The electrical device 3700 may include an other input device 3720 (or corresponding interface circuitry, as discussed above). Examples of the other input device 3720 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 3700 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 3700 may be any other electronic device that processes data. In some embodiments, the electrical device 3700 may comprise multiple discrete physical components. Given the range of devices that the electrical device 3700 can be manifested as in various embodiments, in some embodiments, the electrical device 3700 can be referred to as a computing device or a computing system.

EXAMPLES

Illustrative examples of the technologies disclosed herein are provided below. An embodiment of the technologies may include any one or more, and any combination of, the examples described below.

Example 1 includes an apparatus comprising a photonic integrated circuit (PIC) die, wherein one or more waveguides are defined in the PIC die; an optical connector interface to mate with an optical connector, wherein the optical connector interface is mounted on a surface of the PIC die; and one or more optical focusing elements configured to focus light from the one or more waveguides into one or more collimated beams, wherein the one or more optical focusing elements are fixed in place relative to the PIC die.

Example 2 includes the subject matter of Example 1, and further including an optical connector mated with the optical connector interface, wherein the optical connector comprises one or more optical fibers, wherein the optical connector comprises one or more second optical focusing elements to focus the one or more collimated beams into the one or more optical fibers.

Example 3 includes the subject matter of any of Examples 1 and 2, and wherein the one or more second optical focusing elements comprise one or more total internal reflection (TIR) mirrors defined in a surface of the optical connector.

Example 4 includes the subject matter of any of Examples 1-3, and further including an optical isolator, wherein the optical isolator is positioned between the one or more optical focusing elements and the one or more second optical focusing elements.

Example 5 includes the subject matter of any of Examples 1-4, and further including an optical isolator, wherein the optical isolator is positioned between the one or more second optical focusing elements and the one or more optical fibers.

Example 6 includes the subject matter of any of Examples 1-5, and wherein the optical connector comprises one or more alignment rods mated with one or more alignment holes defined in the optical connector interface.

Example 7 includes the subject matter of any of Examples 1-6, and wherein the one or more second optical focusing elements are defined in a transmissive surface of the optical connector.

Example 8 includes the subject matter of any of Examples 1-7, and wherein the one or more second optical focusing elements are defined in a reflective surface of the optical connector.

Example 9 includes the subject matter of any of Examples 1-8, and wherein the optical connector mates with the optical connector interface by plugging into the optical connector interface.

Example 10 includes the subject matter of any of Examples 1-9, and wherein the optical connector mates with the optical connector interface by mating a V-shaped protrusion of the optical connector with a V-shaped cavity defined in the optical connector interface.

Example 11 includes the subject matter of any of Examples 1-10, and wherein the optical connector is plugged into the optical connector interface by moving the optical connector towards the surface of the PIC die.

Example 12 includes the subject matter of any of Examples 1-11, and wherein the optical connector is plugged into the optical connector interface by moving the optical connector parallel to the surface of the PIC die.

Example 13 includes the subject matter of any of Examples 1-12, and wherein the one or more optical focusing elements are defined in a transmissive surface of the optical connector interface.

Example 14 includes the subject matter of any of Examples 1-13, and further including one or more vertical couplers to direct light from the one or more waveguides to the one or more optical focusing elements.

Example 15 includes the subject matter of any of Examples 1-14, and wherein the optical connector interface comprises one or more surfaces to reflect light from the one or more waveguides to the one or more optical focusing elements.

Example 16 includes the subject matter of any of Examples 1-15, and wherein the one or more waveguides extend to a side surface of the PIC die, wherein the one or more focusing elements extend below a plane defined by the surface of the PIC die.

Example 17 includes the subject matter of any of Examples 1-16, and wherein the one or more focusing elements are part of the optical connector interface.

Example 18 includes the subject matter of any of Examples 1-17, and wherein the one or more focusing elements are separate from the optical connector interface.

Example 19 includes the subject matter of any of Examples 1-18, and wherein the one or more focusing elements comprise one or more focusing mirrors to collimate light from the one or more waveguides, wherein individual focusing mirrors of the one or more focusing mirrors are total internal reflection (TIR) mirrors defined in a surface of the optical connector interface; and one or more flat mirrors to reflect light from the one or more focusing mirrors to one or more optical fibers of an optical connector mated with the optical connector interface, wherein individual flat mirrors of the one or more flat mirrors are TIR mirrors defined in a surface of the optical connector interface.

Example 20 includes the subject matter of any of Examples 1-19, and further including a circuit board, wherein the PIC is mated to the circuit board; and one or more electrical integrated circuits mated to the circuit board.

Example 21 includes an apparatus comprising a photonic integrated circuit (PIC) die comprising one or more waveguides; an optical connector interface, wherein the optical connector interface is mounted on a surface of the PIC die; an optical connector mated with the optical connector interface, wherein the optical connector comprises one or more optical fibers; wherein the optical connector interface comprises one or more optical focusing elements configured to focus light emitted from the one or more waveguides to the one or more optical fibers of the optical connector.

Example 22 includes the subject matter of Example 21, and wherein the optical connector comprises one or more alignment rods mated with one or more alignment holes defined in the optical connector interface.

Example 23 includes an optical connector comprising one or more optical fibers positioned inside the optical connector one or more optical focusing elements defined in a surface of the optical connector, the one or more optical focusing elements to focus a collimated beam entering the optical connector to the one or more optical fibers.

Example 24 includes the subject matter of Example 23, and further including an optical isolator, wherein the optical isolator is positioned between the one or more optical focusing elements and the one or more optical fibers.

Example 25 includes the subject matter of any of Examples 23 and 24, and wherein the optical connector comprises one or more alignment rods to mate with one or more alignment holes defined in an optical connector interface.

Example 26 includes the subject matter of any of Examples 23-25, and wherein the one or more optical focusing elements are defined in a transmissive surface of the optical connector.

Example 27 includes the subject matter of any of Examples 23-26, and wherein the one or more optical focusing elements are defined in a reflective surface of the optical connector.

Example 28 includes the subject matter of any of Examples 23-27, and wherein the optical connector is to mate with an optical connector interface by plugging into the optical connector interface.

The invention claimed is:

1. An apparatus comprising:

a photonic integrated circuit (PIC) die, wherein one or more waveguides are defined in the PIC die;

an optical connector interface to mate with an optical connector, wherein the optical connector interface is mounted on a surface of the PIC die; and one or more optical focusing elements configured to focus light from the one or more waveguides into one or more collimated beams, wherein the one or more optical focusing elements are fixed in place relative to the PIC die, wherein the one or more optical focusing elements comprise:

one or more focusing mirrors to collimate light from the one or more waveguides, wherein individual focusing mirrors of the one or more focusing mirrors are total internal reflection (TIR) mirrors defined in a surface of the optical connector interface; and one or more flat mirrors to reflect light from the one or more focusing mirrors to one or more optical fibers of an optical connector mated with the optical connector interface, wherein individual flat mirrors of the one or more flat mirrors are TIR mirrors defined in a surface of the optical connector interface.

2. The apparatus of claim 1, wherein the optical connector comprises one or more second optical focusing elements to focus the one or more collimated beams into the one or more optical fibers.

3. The apparatus of claim 2, further comprising an optical isolator, wherein the optical isolator is positioned between the one or more optical focusing elements and the one or more second optical focusing elements.

4. The apparatus of claim 2, further comprising an optical isolator, wherein the optical isolator is positioned between the one or more second optical focusing elements and the one or more optical fibers.

5. The apparatus of claim 2, wherein the optical connector comprises one or more alignment rods mated with one or more alignment holes defined in the optical connector interface.

6. The apparatus of claim 2, wherein the one or more second optical focusing elements are defined in a transmissive surface of the optical connector.

7. The apparatus of claim 2, wherein the one or more second optical focusing elements are defined in a reflective surface of the optical connector.

8. The apparatus of claim 2, wherein the optical connector mates with the optical connector interface by plugging into the optical connector interface.

9. The apparatus of claim 8, wherein the optical connector mates with the optical connector interface by mating a V-shaped protrusion of the optical connector with a V-shaped cavity defined in the optical connector interface.

10. The apparatus of claim 2, wherein the optical connector is plugged into the optical connector interface by moving the optical connector towards the surface of the PIC die.

11. The apparatus of claim 2, wherein the optical connector is plugged into the optical connector interface by moving the optical connector parallel to the surface of the PIC die.

12. The apparatus of claim 1, further comprising one or more vertical couplers to direct light from the one or more waveguides to the one or more optical focusing elements.

13. The apparatus of claim 1, wherein the one or more waveguides extend to a side surface of the PIC die, wherein the one or more optical focusing elements extend below a plane defined by the surface of the PIC die.

14. The apparatus of claim 1, wherein the one or more optical focusing elements are separate from the optical connector interface.

15. The apparatus of claim 1, further comprising:

a circuit board, wherein the PIC die is mated to the circuit board; and one or more electrical integrated circuits mated to the circuit board.

16. An apparatus comprising:

a photonic integrated circuit (PIC) die comprising one or more waveguides;

an optical connector interface, wherein the optical connector interface is mounted on a surface of the PIC die;

an optical connector mated with the optical connector interface, wherein the optical connector comprises one or more optical fibers;

wherein the optical connector interface comprises one or more optical focusing elements configured to focus light emitted from the one or more waveguides to the one or more optical fibers of the optical connector, wherein the one or more optical focusing elements comprise:

one or more focusing mirrors to collimate light from the one or more waveguides, wherein individual focusing mirrors of the one or more focusing mirrors are total internal reflection (TIR) mirrors defined in a surface of the optical connector interface; and one or more flat mirrors to reflect light from the one or more focusing mirrors to the one or more optical fibers, wherein individual flat mirrors of the one or more flat mirrors are TIR mirrors defined in a surface of the optical connector interface.

17. The apparatus of claim 16, wherein the optical connector comprises one or more alignment rods mated with one or more alignment holes defined in the optical connector interface.

* * * * *